US012322894B2

(12) United States Patent
Droesbeke et al.

(10) Patent No.: US 12,322,894 B2
(45) Date of Patent: Jun. 3, 2025

(54) CONNECTOR ASSEMBLY WITH FUNNEL-SHAPED SIGNAL CONTACT END SECTION

(71) Applicant: Aptiv Technologies AG, Schaffhausen (CH)

(72) Inventors: Gert Droesbeke, Erkrath (DE); Valery Volkov, Bochum (DE)

(73) Assignee: Aptiv Technologies AG, Schaffhausen (CH)

( * ) Notice: Subject to any disclaimer, the term of this patent is extended or adjusted under 35 U.S.C. 154(b) by 384 days.

(21) Appl. No.: 17/983,731

(22) Filed: Nov. 9, 2022

(65) Prior Publication Data

US 2023/0143087 A1 May 11, 2023

(30) Foreign Application Priority Data

Nov. 10, 2021 (EP) .................................... 21207596
Dec. 9, 2021 (EP) .................................... 21213495

(51) Int. Cl.

| | |
|---|---|
| ***H01R 13/506*** | (2006.01) |
| ***H01R 13/11*** | (2006.01) |
| ***H01R 13/115*** | (2006.01) |
| ***H01R 24/20*** | (2011.01) |

(52) U.S. Cl.
CPC ......... *H01R 13/506* (2013.01); *H01R 13/111* (2013.01); *H01R 13/115* (2013.01); *H01R 24/20* (2013.01)

(58) Field of Classification Search
None
See application file for complete search history.

(56) References Cited

U.S. PATENT DOCUMENTS

| | | | | |
|---|---|---|---|---|
| 3,122,408 A * | 2/1964 | Laszczewski | ........ | H01R 13/193 439/625 |
| 4,634,201 A * | 1/1987 | Kemka | .................... | H01R 4/01 439/161 |
| 6,039,614 A * | 3/2000 | Ramari | .................. | H01R 13/20 439/846 |
| 2011/0222583 A1 | 9/2011 | Boghun et al. | | |

(Continued)

FOREIGN PATENT DOCUMENTS

| | | |
|---|---|---|
| CN | 208508037 U | 2/2019 |
| CN | 112290244 A | 1/2021 |

(Continued)

OTHER PUBLICATIONS

"Extended European Search Report"; European Patent Office; mailed on Jun. 12, 2023; 5 Pages.

(Continued)

*Primary Examiner* — Oscar C Jimenez
(74) *Attorney, Agent, or Firm* — Billion & Armitage

(57) ABSTRACT

A connector assembly includes at least one elongated inner signal contact having a first connection portion. The first connection portion includes a tube-like main section and a funnel-shaped end section. The first connection portion further includes an insulating element. The insulating element defines at least one elongated cavity designed to accommodate the elongated inner signal contact. A maximum outer cross-sectional dimension of the funnel-shaped end section is greater than a minimum cross-sectional dimension of the elongated cavity.

18 Claims, 25 Drawing Sheets

(56) References Cited

U.S. PATENT DOCUMENTS

| | | | | |
|---|---|---|---|---|
| 2014/0148062 A1* | 5/2014 | Mott | H01R 4/28 174/549 |
| 2018/0233870 A1 | 8/2018 | Schlipf | |
| 2021/0057854 A1 | 2/2021 | Droesbeke | |
| 2021/0066856 A1* | 3/2021 | Droesbeke | H01R 24/568 |
| 2023/0198184 A1* | 6/2023 | Lai | H01R 13/112 439/682 |

FOREIGN PATENT DOCUMENTS

| | | | |
|---|---|---|---|
| CN | 215645123 | U | 1/2022 |
| DE | 2526407 | B1 | 9/1976 |
| DE | 8518567 | U1 | 8/1985 |
| DE | 102013010981 | B3 | 8/2014 |
| DE | 102016105227 | A1 | 9/2017 |
| EP | 3783754 | A1 | 2/2021 |
| FR | 2270694 | A1 | 12/1975 |

OTHER PUBLICATIONS

English Translation of Abstract for DE Application No. 2526407 B1.

English Translation of Abstract for DE Application No. 8518567 U1.

Extended European search report for Application No. 21213495.1; mailed May 30, 2022; 5 pages.

"Extended European Search Report for Application No. 23219341.7" European Patent Office; issued Jul. 1, 2024; 38 pages.

* cited by examiner

CONNECTOR ASSEMBLY WITH FUNNEL-SHAPED SIGNAL CONTACT END SECTION

CROSS-REFERENCE TO RELATED APPLICATION

This application claims benefit of priority to European Patent Application No. 21207596.4 filed on Dec. 9, 2021, and European Patent Application No. 21213495.1 filed on Nov. 10, 2021, the entire disclosure of each of which is hereby incorporated by reference.

TECHNICAL FIELD OF THE INVENTION

The present disclosure relates to a connector assembly, preferably for multi GHz applications. In particular, the disclosure relates to a high speed twisted pair data connector assembly.

BACKGROUND

High speed twisted pair data cables may be used for automotive 4K camera systems, autonomous driving, RADAR, LIDAR, high-resolution displays and rear seat entertainment. The connectors of these cables may be configured to allow data transmission up to 15 GHz or 20 Gbps while providing a small package size.

In such high-speed applications, every tenth of a millimeter of the interconnection channel and of the signal connectors should be within a certain data transmission (differential) impedance bandwidth (typically 100±5Ω) and should be matched to preceding and succeeding sections. To this end, in each of these sections, metal portions of an inner contact or signal contact and an outer contact or shielding, insulating material of an insulating element and any air gaps must be balanced in size and position with respect to each other. However, there is also a need for these components to meet other non-signal-integrity requirements, in particular mechanical requirements. For example, it has to be ensured that a male signal contact is always correctly guided into a corresponding female signal contact. To achieve high data transmission, an optimum electrical and mechanical connection between a male signal contact and a female signal contact is indispensable. Accordingly, there is a need to provide a connector assembly of high speed twisted pair data cables that enables a more accurate connection between male and female signal contacts.

SUMMARY

In one aspect, the present disclosure is directed at a connector assembly. The connector assembly includes at least one elongated inner signal contact having a first connection portion. The first connection portion includes a tube-like main section and a funnel-shaped end section; and an insulating element. The insulating element defines at least one elongated cavity designed to accommodate the elongated inner signal contact. A maximum outer cross-sectional dimension of the funnel-shaped end section is greater than a minimum cross-sectional dimension of the elongated cavity.

The connector assembly may be configured for high speed data transmission. In particular, the connector assembly may be for high speed twisted pair data cables in automotive applications.

The connector assembly described herein is a female connector assembly, i.e., the inner signal contact is a female signal contact. The inner signal contact has a funnel-shaped end section allowing for pin movement, i.e., allowing insertion of a male signal contact pin.

The inner signal contact is embedded in an insulating element which may form a one-part housing or a multi-part housing, in particular a two-part housing. More specifically, the insulating element may define a cavity having a first cavity portion which receives the tube-like main section of the inner signal contact, and a second cavity portion which receives the funnel-shaped end section of the inner signal contact. A cross-sectional dimension of the first cavity portion, also referred to as a minimum cross-sectional dimension of the cavity, and an outer cross-sectional dimension of the tube-like main section may be substantially equal, i.e., the tube-like main section may be embedded in the first cavity portion with marginal clearance between the tube-like main section and the insulating material defining the first cavity portion.

Since the inner signal contact expands or flares in a direction away from the tube-like main section to form the funnel-shaped end section, a maximum outer cross-sectional dimension of the funnel-shaped end section is greater than the outer cross-sectional dimension of the tube-like main section. Consequently, the maximum outer cross-sectional dimension of the funnel-shaped end section is also greater than the cross-sectional dimension of the first cavity portion, i.e., the minimum cross-sectional dimension of the cavity, thereby making it generally impossible for the inner signal contact to be pushed along the length of the cavity.

It is to be understood that in order to be able to accommodate the funnel-shaped end section of the inner signal contact, the cross-sectional dimension of the second cavity portion, also referred to as a maximum cross-sectional dimension of the cavity, must at least correspond to the maximum outer cross-sectional dimension of the funnel-shaped end section and as such is also greater than the minimum cross-sectional dimension of the cavity.

According to an embodiment, the funnel-shaped end section may include a first end section part and a second end section part. The first end section part and the second end section part are separated by two air gaps. The air gaps may be diagonally arranged, i.e., the two air gaps are arranged opposite from each other. The first end section and the second end section of the funnel-shaped end section allow a spreading apart of the funnel-shaped end section to thereby make the insertion of a male signal contact pin easier. According to another embodiment, the funnel-shaped end section may be a machined end section or a stamped, rolled, or bent end section, in which a first end section part and a second end section part are separated by just one small slit.

According to an embodiment, the insulating element may include at least one front opening configured to receive the funnel-shaped end section, and two chamfers protruding into the air gaps such that the first end section part, the second end section part and the two chamfers define an inlet. In other words, the chamfers may radially protrude into the front opening. The two chamfers may be arranged diagonally to each other.

The front opening of the insulating element may be configured to receive a male signal contact, and the inlet serves to lead the male signal contact into the female inner signal contact of the connector assembly. The inlet may provide an at least approximately 360° lead-in cone to guide the male signal contact into the tube-like main section of the female inner signal contact. Thus, an incorrect connection of the signal contacts can be prevented which may occur by inserting the male signal contact past the inner signal contact. Furthermore, damage to at least one of the male signal contact, the inner signal contact and the insulating element may be avoided.

According to an embodiment, the funnel-shaped end section includes a first end section part and a second end section part. The first end section part and the second end section part are separated by two air gaps. The insulating element includes at least one rib engaging one of the air gaps and thereby widening the funnel-shaped end section. the size of the inlet may be maximized by widening the funnel-shaped end section. The two air gaps may be arranged diagonally to each other.

According to an embodiment, the insulating element and the at least one elongated inner signal contact may include at least one protrusion and at least one recess, respectively. The protrusion and the recess are configured to cooperate in order to at least reduce or even prevent a rotation and/or an axial movement of the at least one elongated inner signal contact relative to the insulating element. The at least one protrusion may be a blocking element that provides a forward stop and/or a backward stop for the at least one elongated inner signal contact in the insulating element. A precise rotational control and limitation of movement of the inner signal contact as well as a precise rigid back and forward stop of the inner signal contact may thus be achieved.

According to an embodiment, the insulating element may include a control element and the at least one elongated inner signal contact may include a hole receiving the control element when the connector assembly is correctly assembled. The control element may be visible in the hole of the at least one elongated inner signal contact when the at least one elongated inner signal contact reaches its correct end-position during assembling. Thus, easy visual confirmation of a correct assembly of the at least one elongated inner signal contact in the insulating element is possible.

According to an embodiment, the insulating element may include at least one clamping element configured to secure a wire to which the at least one elongated inner signal contact is connected.

According to an embodiment, the at least one elongated inner signal contact may include a termination element configured to receive a wire and the insulating element may include at least one retaining element configured to secure the termination element and/or the wire in the insulating element. The termination element may include a pair of crimping wings or any other suitable termination means.

According to another embodiment, the insulating element may include a first insulating part and a second insulating part. The first insulating part and the second insulating part surround the at least one inner signal contact. The terms "first" and "second" are only used to differentiate the two insulation parts. There is no restriction to features concerning the first insulating part or the second insulating part, i.e., all features of the first insulating part may also be features of the second insulating part.

According to an embodiment, one of the first insulating part and the second insulating part may be configured to be radially mounted in respect of the at least one elongated inner signal contact and the respective other one of the first insulating part and the second insulating part is configured to be axially slid onto the at least one elongated inner signal contact.

According to an embodiment, the at least one elongated inner signal contact may be pinched into the first insulating part or the second insulating part.

According to an embodiment, the first insulating part or the second insulating part may include a press fit element configured to secure the first insulating part to the second insulating part.

According to an embodiment, the first insulating part or the second insulating part may include at least one locking element configured to snap fit the first insulating part and the second insulating part together and thereby secure the first insulating part to the second insulating part. The locking element may provide a passive lock and/or an active lock.

According to an embodiment, the first insulating part or the second insulating part may include a pin and the respective other one of the first insulating part and the second insulating part includes a slot. The slot is configured to receive the pin and the pin is deformed and secured in the slot to thereby secure the first insulating part to the second insulating part.

According to an embodiment, the first insulating part or the second insulating part may include a groove and the respective other one of the first insulating part and the second insulating part may include a tongue received in the groove.

According to an embodiment, the first insulating part or the second insulating part may include a locking cavity and the respective other one of the first insulating part and the second insulating part may include a locking protrusion received in the locking cavity.

BRIEF DESCRIPTION OF THE DRAWINGS

The present invention is now described, by way of example with reference to the accompanying drawings, in which.

DETAILED DESCRIPTION

Figure 1:
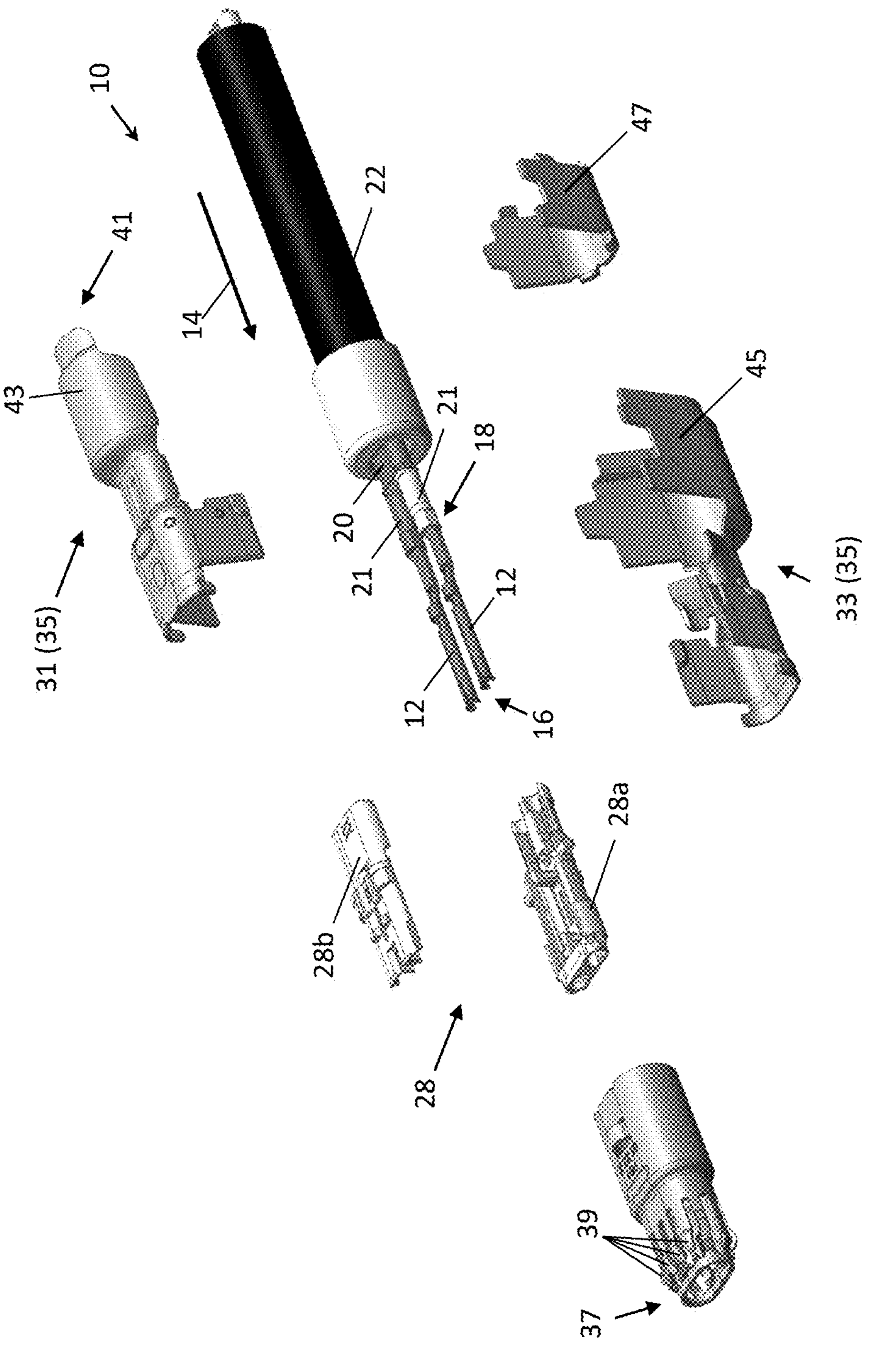
FIG. 1 shows an exploded view of a connector according to an embodiment.

FIG. 1 depicts an exploded view of a connector 10, in particular a female connector, including two elongated inner signal contacts 12 arranged generally parallel to each other along an axial direction 14 of the connector 10. The signal contacts 12 have a first connection portion 16 for connecting the connector 10 to a mating connector, in particular a male connector, and a second connection portion 18 for connecting the signal contacts 12 to respective conductors 21 of a cable 22. The conductors 21 may be strands. Furthermore, the conductors 21 may be embedded in a wire insulation 20. The second connection portion 18 may include a termination element 24 including, for example, two crimping wings (shown in FIGS. 3A and 3B) or may have a welding portion having a welding opening 26 (shown in FIG. 3C). The welding opening 26 may be used to connect the signal contacts 12 to respective conductors 21 of the cable 22 via laser welding or ultrasonic welding. Alternatively, resistance welding can be used to connect the signal contacts 12 to respective conductors 21 of the cable 22.

The inner signal contacts 12 are arranged in an insulating element 28 which may form a di-electric housing. In the embodiment shown in FIG. 1, the insulating element 28 includes two separate insulating parts, a first insulating part 28*a* and a second insulating part 28*b*, which together enclose the inner signal contacts 12. The first insulating part 28*a* and the second insulating part 28*b* may be attached to each other, for example, by a click-on connection, i.e., by a snap fit engagement. It is to be understood that the first insulating part 28*a* and the second insulating part 28*b* may be attached to each other by other suitable connections, as will be described further below. Furthermore, it is to be understood that the insulating element 28 may also be a one-part insulating element 28, for example, produced by injection molding, i.e., by overmolding the inner signal contacts 12. In such an insulating element 28, undesirable air pockets may be minimized.

The first insulating part 28*a* fulfills the task of locking the signal contacts 12 in the axial direction 14 so that the inner signal contacts 12 maintain their axial position when the connector 10 is connected to a mating connector. It is to be understood that, additionally or alternatively, the second insulating part 28*b* may fulfill the task of locking the signal contacts 12 in the axial direction 14.

The connector 10 further includes a first shielding part 31 and a second shielding part 33 both formed as half shells which together form an outer shielding contact 35. The outer shielding contact 35 surrounds the inner signal contacts 12 and the insulating element 28 to provide a shield against interfering signals. However, the outer shielding contact 35 can also be used as an electrical conductor to transport electric power. At a distal end 37 of the connector 10, the connector 10 includes multiple shielding contacts 39. At a proximal end 41 of the connector 10, the first shielding part 31 forms a cover 43. The second shielding part 33 forms a crimping portion 45 at the proximal end 41 of the connector 10 to mechanically and electrically connect the outer shielding contact 35 to the cable 22. Furthermore, the connector 10 includes an inner crimp ferrule 47 which is placed around the cable 22.

Figure 2A:
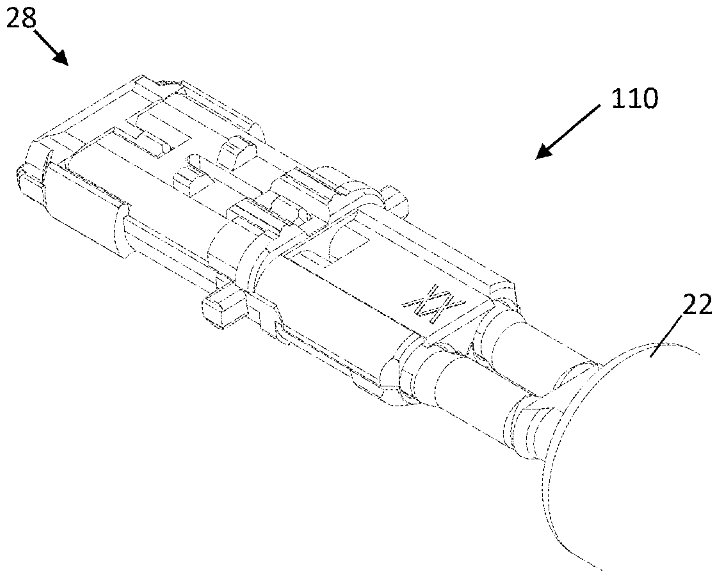
FIG. 2A shows an isometric view of a connector assembly according to an embodiment.
Figure 2B:
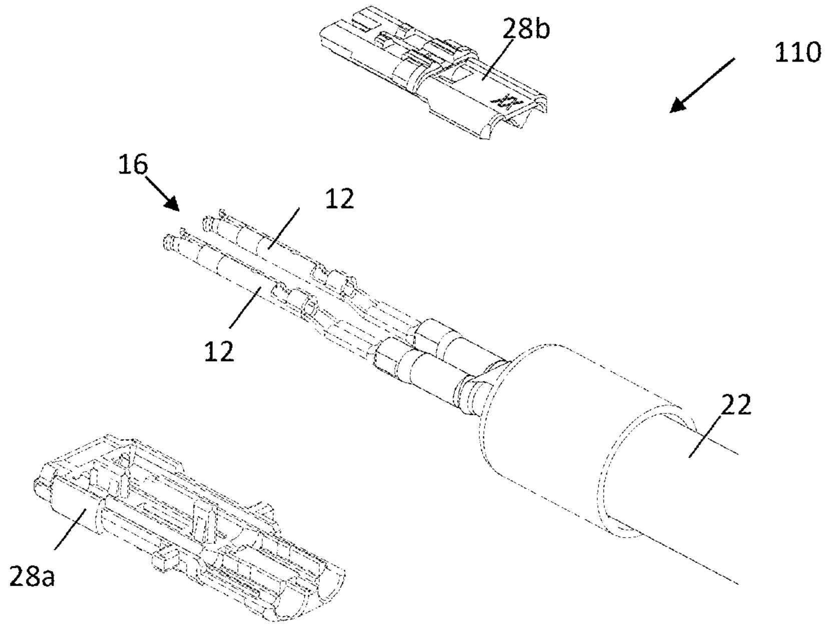
FIG. 2B shows an exploded view of the connector assembly of FIG. 2A according to an embodiment.

The inner signal contacts 12 and the insulating element 28 together form a connector assembly 110 according to an embodiment of the present disclosure, as shown in FIG. 2A. FIG. 2B shows an exploded view of the connector assembly 110.

Figure 3A:
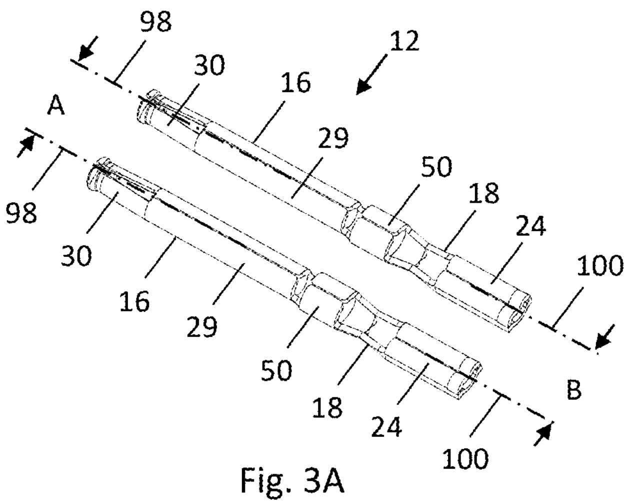
FIG. 3A shows an isometric view of inner signal contacts according to an embodiment.
Figure 3B:
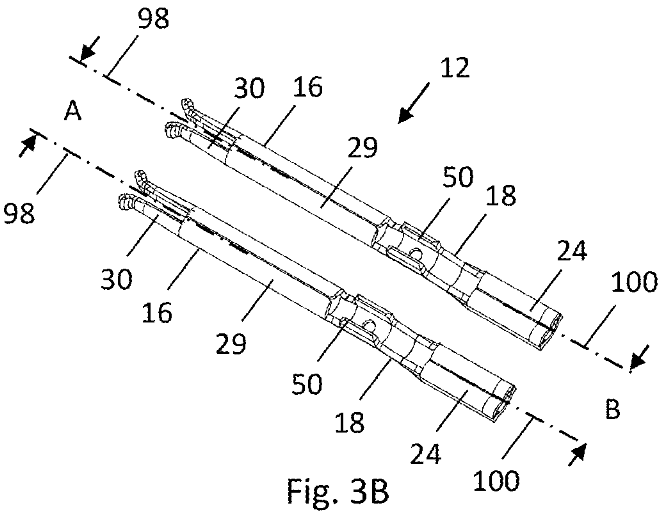
FIG. 3B shows an isometric view of inner signal contacts according to another embodiment.
Figure 3C:
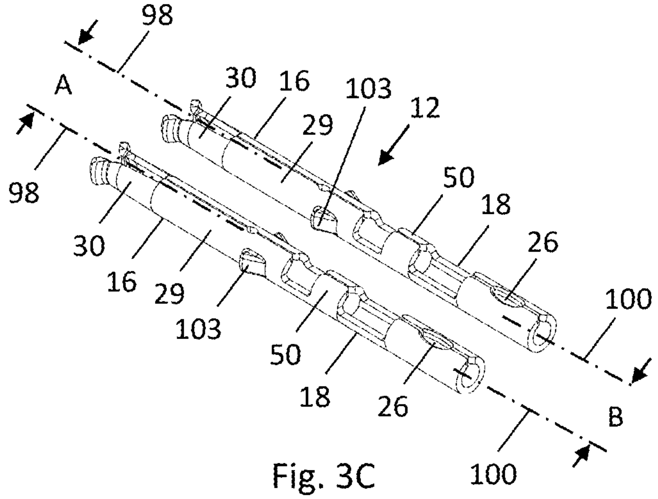
FIG. 3C shows an isometric view of inner signal contacts according to another embodiment.

FIGS. 3A, 3B and 3C depict an isometric view of the inner signal contacts 12 according to various embodiments. The inner signal contacts 12 generally extend parallel to one another. Each inner signal contact 12 has a first connection portion 16 for connecting the signal contact 12 to a mating signal contact and a second connection portion 18 for connecting the signal contact 12 to a respective conductor 21 of a cable 22 (see FIG. 1). The first connection portion 16 has a tube-like main section 29 defining a first center axis 98 and a funnel-shaped end section 30. The tube-like main section 29 may have a round, in particular a generally circular or oval, or a polygonal cross-section. The second connection portion 18 defines a second center axis 100 where a center axis of the cable 22 is placed. A distance A between the center axes 98 of the first connection portions 16 may be equal or larger than a distance B between the center axes 100 of the second connection portions 18. Alternatively, a distance A between the center axes 98 of the first connection portions 16 may be smaller than a distance B between the center axes 100 of the second connection portions 18. In other words, the inner signal contacts 12 may be formed so that a pitch translation may be generated. Each of the inner signal contacts 12 may be formed so that the first center axis 98 is spaced apart in parallel from the second center axis 100.

In another embodiment, shown in FIG. 3C, the inner signal contacts 12 differ from the inner signal contacts 12 of FIGS. 3A and 3B in that hooks 103 are formed at side surfaces of the first connection portions 16. The hooks 103 help to axially fix the inner signal contacts 12 in the insulating element 28.

The second connection portions 18 of the inner signal contacts 12 may include welding openings 26 (see FIG. 3C) that are arranged to allow, for example, a laser beam to weld a conductor 21 to the inner signal contacts 12. Alternatively, termination elements 24 can be formed at the second connection portions 18 so that the inner signal contacts 12 can be attached onto the wires insulating 20 of the cable 22 (FIGS. 3A and 3B).

The inner signal contacts 12 may include signal contact portions 50. In one embodiment, the signal contact portions 50 may have an oval cross-section, as shown in FIG. 3A. In another embodiment the signal contact portions 50 may have a U-shaped cross-section, as shown in FIG. 3B. In yet another embodiment, the signal contact portions 50 may have a circular cross-section, as shown in FIG. 3C. It is to be understood that the shape of the signal contact portions 50 is not limited to the shapes shown in FIGS. 3A to 3C. Rather, the signal contact portions 50 may be of any suitable shape. The signal portions 50 may be configured to at least reduce or even prevent a rotation and/or an axial movement of the at least one elongated inner signal contact 12 relative to the insulating element 28. The signal portions 50 may be defined as blocking elements that provide a forward stop and/or a backward stop for the at least one elongated inner signal contact 12 in the insulating element 28. A precise rotational control and limitation of movement of the inner signal contact 12 as well as a precise rigid back and forward stop of the inner signal contact 12 may thus be achieved. The signal portions 50 may also be configured to receive a wire insulation 20.

Figure 4A:
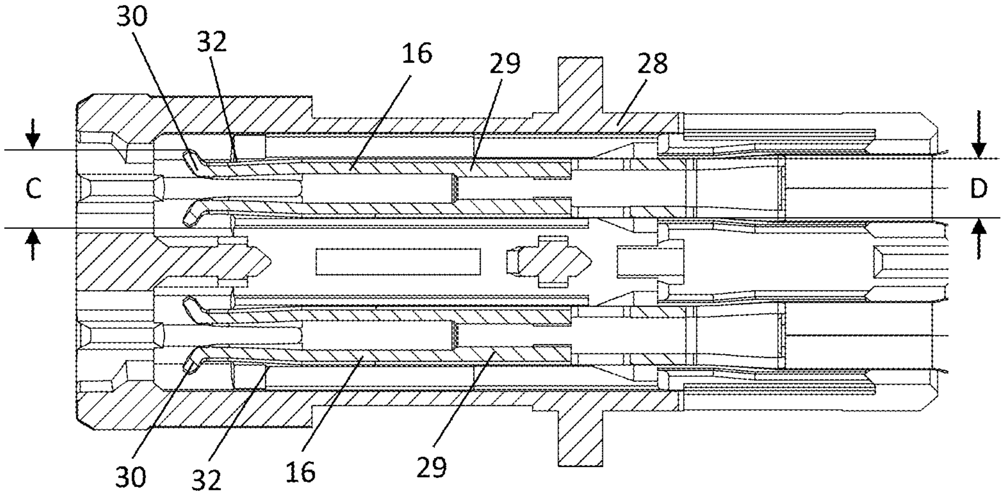
FIG. 4A shows a cross-sectional view of the connector assembly in a partly assembled state according to an embodiment.
Figure 4B:
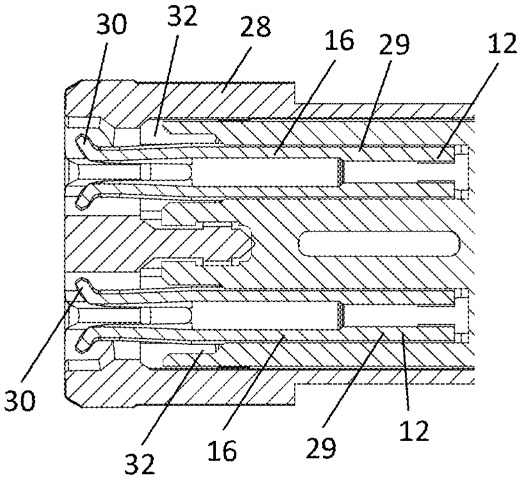
FIG. 4B shows a cross-sectional view of the connector assembly in a fully assembled state according to an embodiment.

FIGS. 4A and 4B show cross-sectional views of a connector assembly 110 in a partly assembled state (see FIG. 4A) and in a fully assembled state (see FIG. 4B). The connector assembly 110 includes at least one elongated inner signal contact 12, in the present embodiment two inner signal contacts 12. Each inner signal contact 12 includes a first connection portion 16 having a tube-like main section 29 and a funnel-shaped end section 30. The tube-like main section 29 may have a round, in particular a generally circular or oval, or a polygonal cross-section. The funnel-shaped end section 30 expands from one end of the tube-like main section 29 such that a maximum outer cross-sectional dimension C of the funnel-shaped end section 30 is greater than a maximum outer cross-sectional dimension of the tube-like main section 29.

The at least one elongated inner signal contact 12 is accommodated in an elongated cavity 32 of the insulating element 28. A first part of the cavity 32 is designed to generally form fittingly receive the tube-like main section 29, i.e., a cross-sectional dimension of the first part of the cavity 32 is generally equal to the outer cross-sectional dimension of the tube-like main section 29, and a second part of the cavity 32 makes room for the funnel-shaped end section 30. In other words, a cross-sectional dimension D of the first part of the cavity 32, also referred to as a minimum cross-sectional dimension D of the cavity 32, corresponds to the outer cross-sectional dimension of the tube-like main section 29, whereas a cross-sectional dimension of the second part of the cavity 32, also referred to as a maximum cross-sectional dimension of the cavity 32, is at least equal to or greater than the maximum outer cross-sectional dimension C of the funnel-shaped end section 30. Since the maximum outer cross-sectional dimension C of the funnel-shaped end section 30 is greater than the maximum outer cross-sectional dimension of the tube-like main section 29, the maximum outer cross-sectional dimension C of the flaring funnel-shaped end section 30 is also greater than the cross-sectional dimension D of the first part of the cavity 32, i.e., the minimum cross-sectional dimension D of the cavity 32. It is to be understood that the dimensions described herein may be diameters if the tube-like main section 29 and the cavity 32 are of circular cross-section.

Figure 5A:
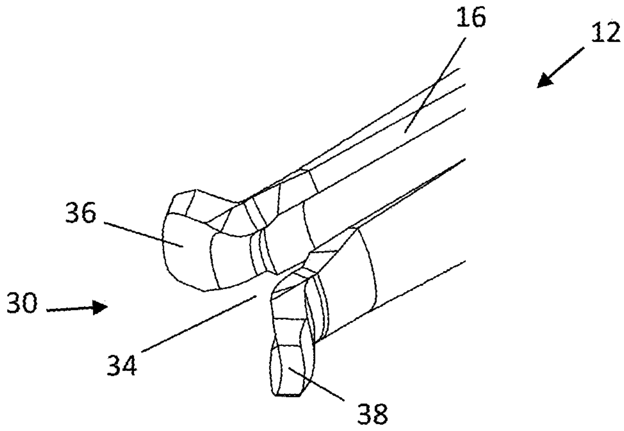
FIG. 5A shows an isometric view of a funnel-shaped end section of an inner signal contact according to an embodiment.
Figure 5B:
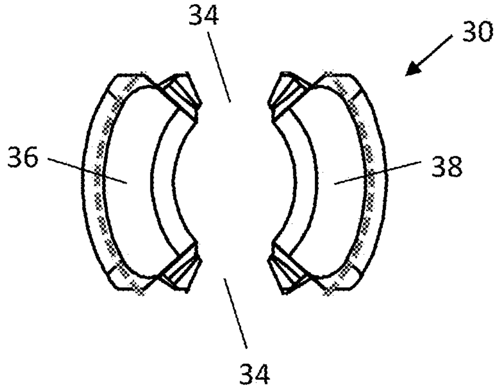
FIG. 5B shows a cross-sectional view of the funnel-shaped end section according to an embodiment.

FIGS. 5A and 5B show an isometric view and a cross-sectional view, respectively, of the funnel-shaped end section 30 of the inner contact 12. The funnel-shaped end section 30 includes a first end section part 36 and a second end section part 38. The first end section part 36 and the second end section part 38 are separated by two air gaps 34, i.e., there is a clearance between the first end section part 36 and the second end section part 38. The first end section part 36 and the second end section part 38 may be diagonally arranged, i.e., arranged opposite from each other. Accordingly, the two air gaps 34 may be diagonally arranged, i.e., arranged opposite from each other.

Figure 6A:
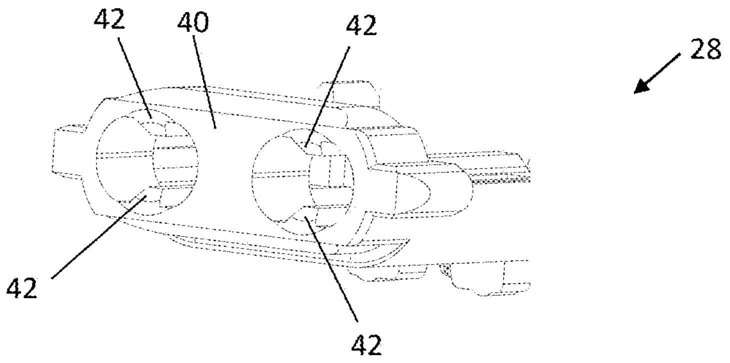
FIG. 6A shows an isometric view of front openings of an insulating element according to an embodiment.
Figure 6B:
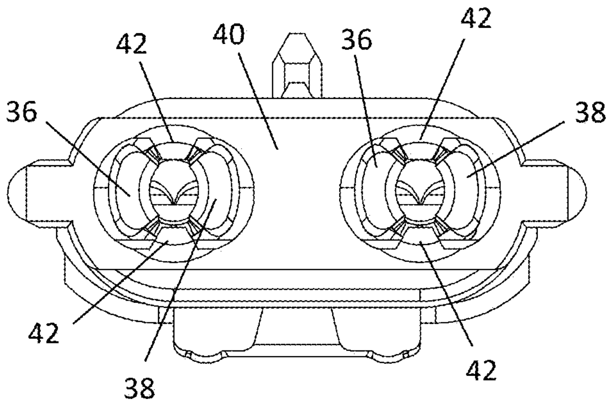
FIG. 6B shows a front view of the front openings having inner signal contacts according to an embodiment.
Figure 6C:
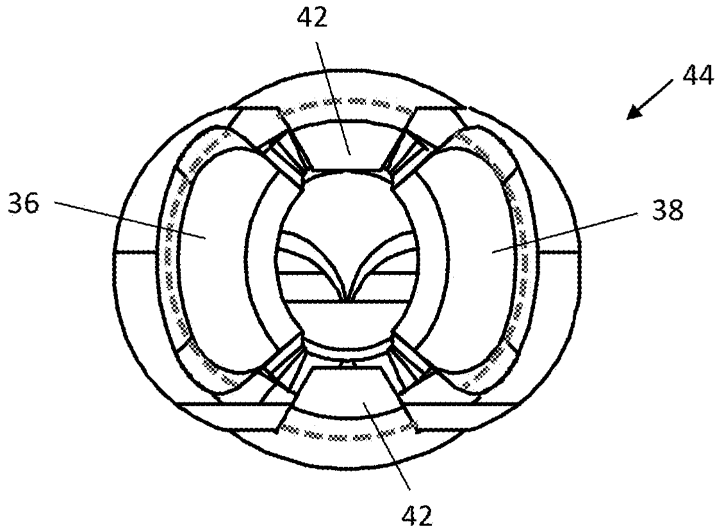
FIG. 6C shows a front view of an inlet opening defined by the inner signal contacts according to an embodiment.

As shown in FIGS. 6A to 6C, each cavity 32 ends in a front opening 40 of the insulation element 28, which allows a mating contact to be connected to the inner contact 12 arranged in the cavity 32. Each front opening 40 is configured to receive the funnel-shaped end section 30 of the inner signal contact 12. Two, for example, diagonally arranged chamfers 42 protrude into the front opening 40 and, more specifically, into the air gaps 34 of the funnel-shaped end section 30 received in the front opening 40.

When the funnel-shaped end section 30 is received in the front opening 40, the first end section part 36, the second end section part 38 and the two chamfers 42 together define an inlet 44 configured to correctly guide a matching male signal contact (not shown) into the female inner signal contact 12. The inlet 44 may form a 360-degree lead-in cone, in particular having an at least substantially closed perimeter, to guide the male signal contact into the inner signal contact 12. Depending on the geometrical definition of the end section parts 36, 38 and the corresponding chamfers 42, the inlet may be of round, in particular circular or oval, or of polygonal cross-section.

Figure 7A:
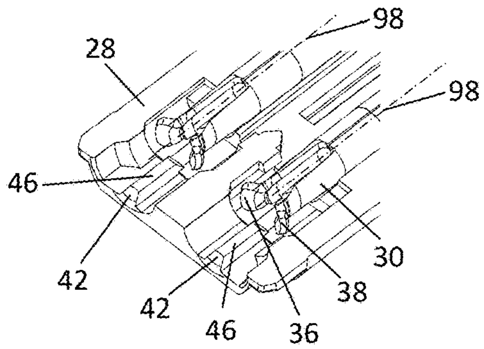
FIG. 7A shows an isometric view of a part of an insulating element having inner signal contacts in a partly assembled state according to an embodiment.
Figure 7B:
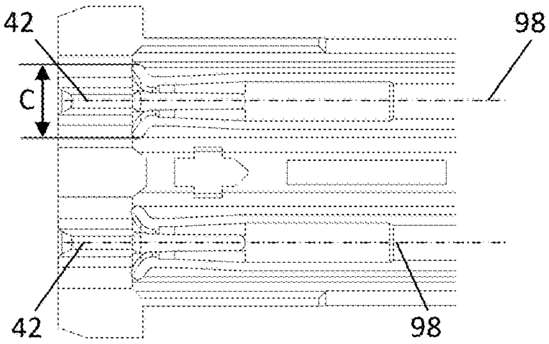
FIG. 7B shows a cross-sectional view of the part of the insulating element having the inner signal contacts in the partly assembled state according to an embodiment.

FIGS. 7A and 7B show a part of the insulating element 28 having inner signal contacts 12 in a partly assembled state of the connector assembly 110. The insulating element 28 includes at least one rib 46 in each cavity 32. The rib 46 may be an extension of one of the chamfers 42 in a direction of the first center axis 98 defined by the respective inner signal contact 12. The rib 46 engages one of the air gaps 34 when the funnel-shaped end section 30 of the inner signal contact 12 is inserted into the front opening 40 and thereby widens the funnel-shaped end section 30. In a not fully assembled state (FIGS. 7A and 7B), the funnel-shaped end section 30 of the inner signal contact 12 is not in contact with the rib 46 and, thus, is in a relaxed state.

Figure 7C:
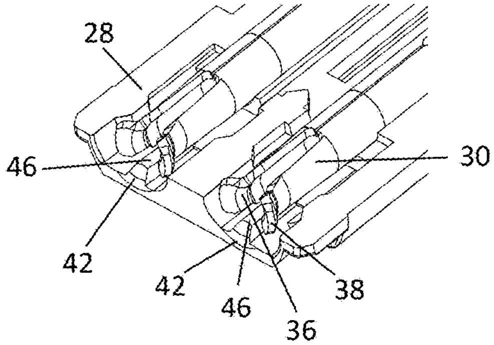
FIG. 7C shows an isometric view of the part of the insulating element having inner signal contacts in a fully assembled state according to an embodiment.
Figure 7D:
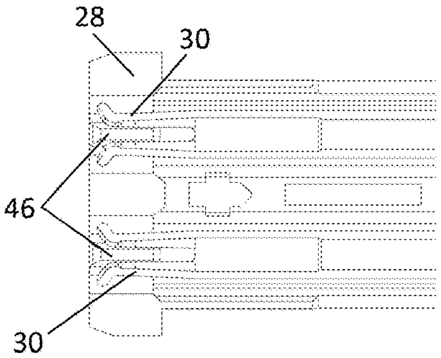
FIG. 7D shows a cross-sectional view of the part of the insulating element having inner signal contacts in the fully assembled state according to an embodiment.

FIG. 7C shows an isometric view and FIG. 7D shows a cross-sectional view of the part of the insulating element 28 having inner signal contacts 12 in a fully assembled state of the connector assembly 110. When the inner signal contacts 12 are inserted into the insulating element 28, the funnel-shaped end section 30, in particular the first end section part 36 and the second end section part 38 are pushed apart by the rib 46 as shown in FIGS. 7C and 7D.

FIGS. 8A to 8F show cross-sectional top views and a cross-sectional side views of further embodiments of the connector assembly 110 in which the insulating element 28 includes at least one protrusion 52 and at least one recess 54 for each inner signal contact 12. The at least one respective inner signal contact 12 also includes at least one protrusion 56 and at least one recess 58, respectively. The at least one protrusion 52 of the insulating element 28 engages with the at least one recess 58 of the inner signal contact 12, and vice versa. In other words, the protrusions 52, 56 and the recesses 54, 58 are configured to cooperate in order to substantially prevent a rotation and/or an axial movement of the inner signal contact 12 relative to the insulating element 28. More specifically, the rotation and/or the axial movement of the inner signal contact 12 relative to the insulating element 28 is reduced, or minimized, or limited to some degree, such that only an insignificant amount of rotation and axial movement of the inner signal contact 12 relative to the insulating element 28 may occur.

Figure 8A:
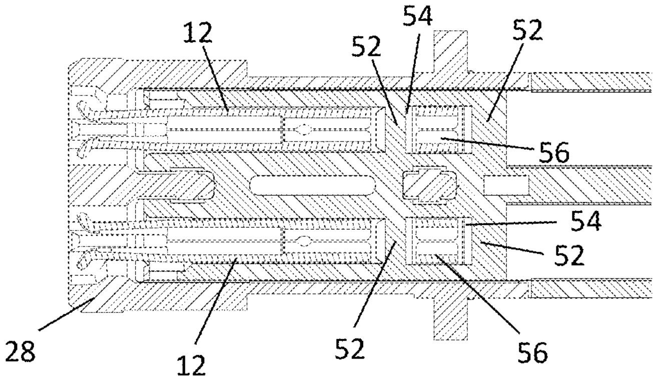
FIG. 8A shows a cross-sectional top view of a connector assembly according to an embodiment.
Figure 8B:
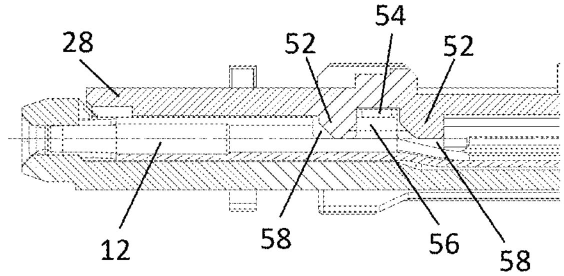
FIG. 8B shows a cross-sectional side view of the connector assembly of FIG. 8A according to an embodiment.
Figure 8C:
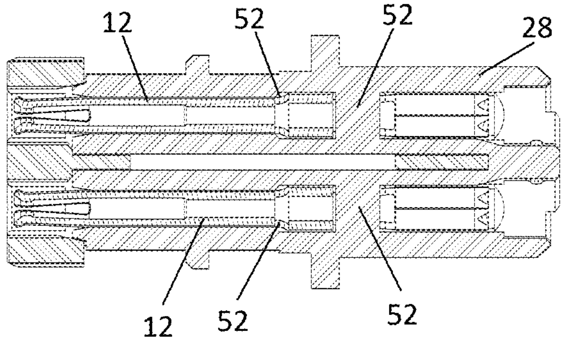
FIG. 8C shows a cross-sectional top view of a connector assembly according to an embodiment.
Figure 8D:
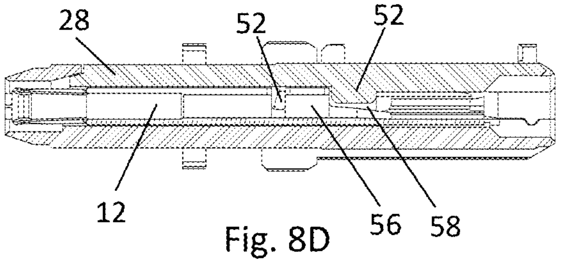
FIG. 8D shows a cross-sectional side view of the connector assembly of FIG. 8C according to an embodiment.
Figure 8E:
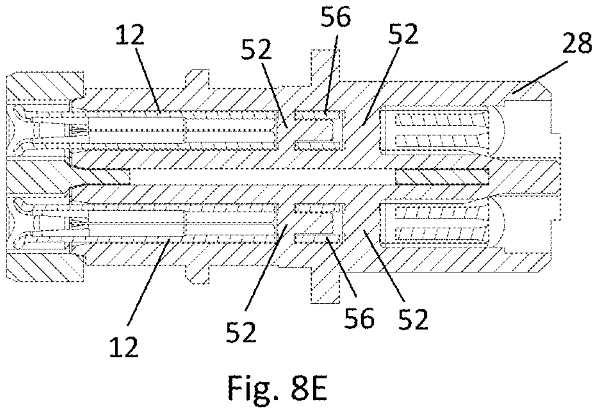
FIG. 8E shows a cross-sectional top view of a connector assembly according to an embodiment.
Figure 8F:
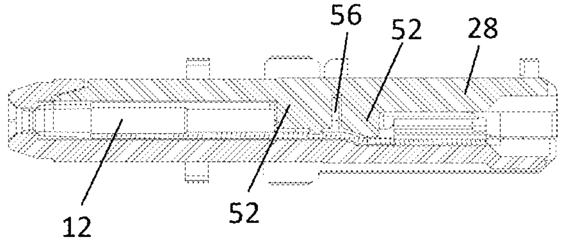
FIG. 8F according to an embodiment a cross-sectional side view of the connector assembly of FIG. 8E according to an embodiment.

The insulating element 28 may include two protrusions 52 for each inner signal contact 12. One protrusion 52 of the insulating element 28 is arranged in front of the protrusion 56 of the inner signal contact 12 and one protrusion 52 of the insulating element 28 is arranged behind the protrusion 56 of the inner signal contact 12, as shown in FIGS. 8A to 8C. The protrusion 52 of the insulating element 28 arranged in front of the protrusion 56 of the inner signal contact 12 may function as a forward stop or a backward stop and the protrusion 52 of the insulating element 28 arranged behind the protrusion 56 of the inner signal contact 12 may function as a backward stop. A forward stop may reduce or even prevent an axial movement of the at least one elongated inner signal contact 12 relative to the insulating element 28 in a forward direction, i.e., in a direction towards the funnel-shaped end section 30 of the inner signal contact 12. A backward stop may reduce or even prevent an axial movement of the at least one elongated inner signal contact 12 relative to the insulating element 28 in a backward direction, i.e., in a direction towards the second connection portion 18 of the inner signal contact 12.

Figure 9A:
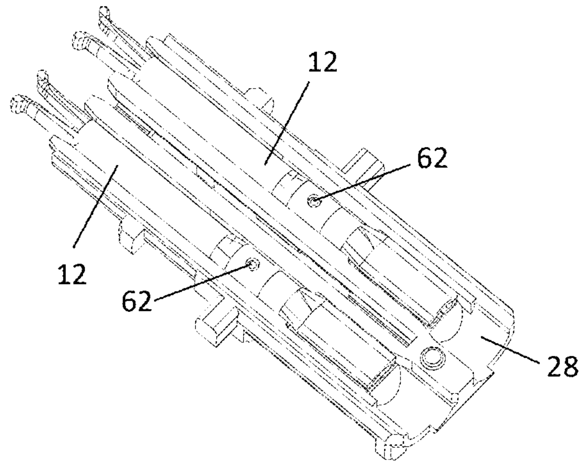
FIG. 9A shows an isometric view of a part of an insulating element having inner signal contacts according to an embodiment.
Figure 9B:
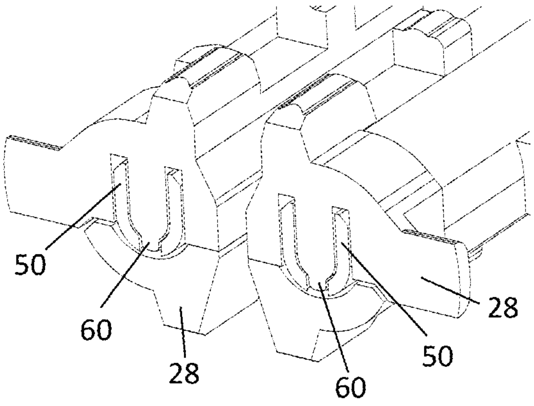
FIG. 9B shows an isometric cross-sectional view of the part of the insulating element having inner signal contacts according to an embodiment.
Figure 9C:
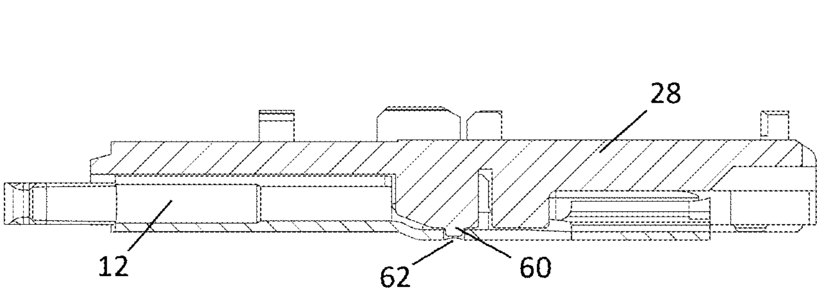
FIG. 9C shows a cross-sectional side view of the part of the insulating element having inner signal contacts according to an embodiment.

FIG. 9A shows an isometric view of a part of an insulating element 28 having two inner signal contacts 12. Each inner signal contact 12 includes a hole 62 defined to receive a corresponding control element 60 of the insulating element 28. The control elements 60 are arranged such that they engage with the holes 62 when the connector assembly 110 is correctly assembled, i.e., when the inner signal contacts 12 are correctly embedded in the insulating element 28. FIGS. 9B and FIG. 9C show the control elements 60 inserted into the holes 62 of U-shaped signal contact portions 50 of the inner signal contacts 12. It is to be understood that the holes 62 and, thus, the control elements 60 may also be arranged at other parts of the inner signal contacts 12. The control elements 60 are visible in the holes 62 of the inner signal contacts 12 when the inner signal contacts 12 reach an end-position during the assembling of the connector assembly 110. Thus, a visual control of the end-position of the inner signal contacts 12 is possible when the inner signal contacts 12 are mounted in the insulating element 28.

Figure 10A:
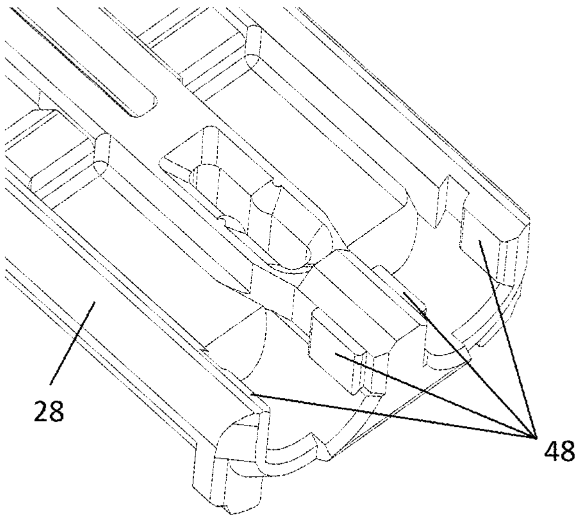
FIG. 10A shows an isometric view of a part of an insulating element according to an embodiment.
Figure 10B:
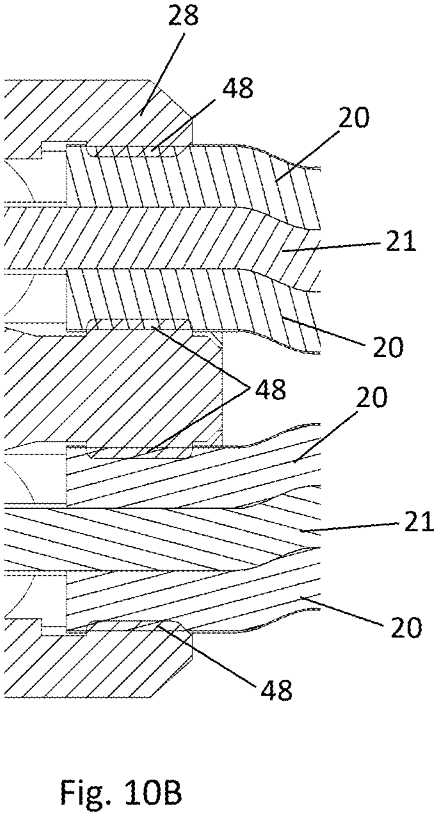
FIG. 10B shows a cross-sectional top view of the part of the insulating element having wires according to an embodiment.

FIGS. 10A and 10B show an insulating element 28 according to a further embodiment. The insulation element 28 includes at least one clamping element 48 in each cavity 32, which is configured to secure the wire insulation 20 of a cable 22 (not shown) and/or a conductor 21 to which the respective inner signal contact 12 is connected. To secure the wire insulation 20 or the conductor 21 in the insulating element 28, a gap defined by two opposing clamping elements 48 is less than a main diameter of the wire insulation 20 or the conductor 21. Thus, the wire insulation 20 or the conductor 21 is clamped in the insulating element 28 when the wire insulation 20 or the conductor 21 is inserted into the gap.

Figure 11A:
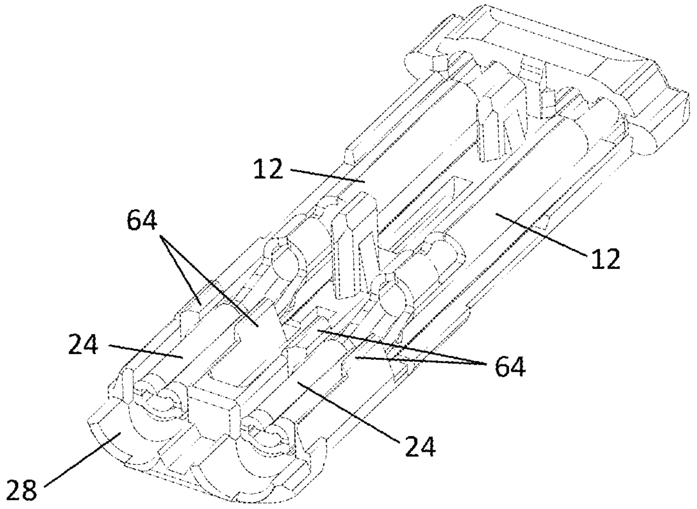
FIG. 11A shows an isometric view of a part of a further embodiment of an insulating element having inner signal contacts according to an embodiment.

FIG. 11A shows an isometric view of a part of the insulating element 28 having two inner signal contacts 12 according to a further embodiment. The inner signal contacts 12 each include a termination element 24, for example, a pair of crimping wings, arranged at the second connection portion 18. The termination element 24 may be configured to secure a wire insulation 20 or a conductor 21, e.g., a conductor, in the inner signal contact 12. The insulating element 28 includes at least one retaining element 64 for each inner signal contact 12, which is configured to secure at least one of the respective termination element 24, the respective wire insulation 20, the conductor 21 and a respective signal contact portion 50 in the insulating element 28. Each retaining element 64 may be designed as a snap arm. Two opposing retaining elements 64 may form a cavity that is configured to hold or secure the termination element 24 or the wire insulation 20.

Figure 11B:
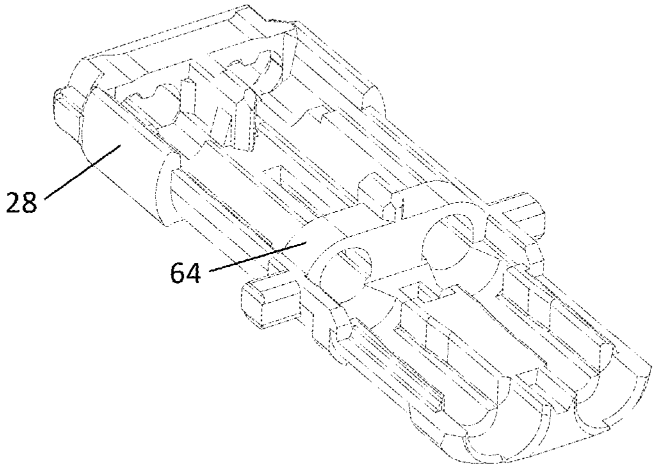
FIG. 11B shows an isometric view of a part of a further embodiment of an insulating element according to an embodiment.

FIG. 11B shows another embodiment of a part of an insulating element 28 in which the retaining element 64 is designed as a bracket that encloses at least one of the termination element 24, the wire insulation 20, the conductor 21 and the signal contact 50. The shape of the bracket may be adapted to the contour of the received element. For example, the bracket may define circular cavities to receive the signal contact portions 50 of the inner signal contacts 12.

Figure 12A:
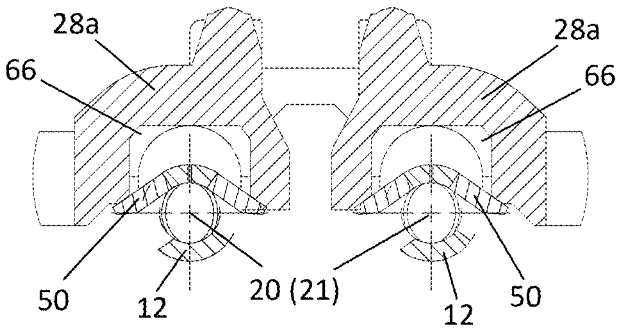
FIG. 12A shows a cross-sectional view of a first embodiment of a first insulating part having inner signal contacts in a partly assembled state according to an embodiment.
Figure 12B:
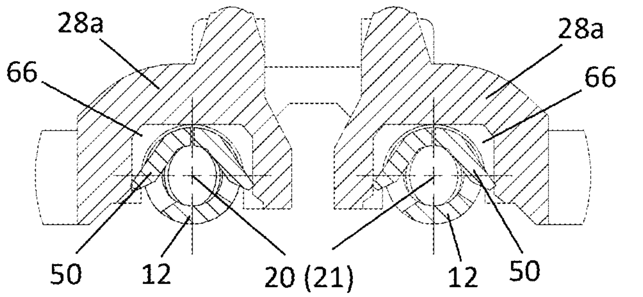
FIG. 12B shows a cross-sectional view of the first embodiment of the first insulating part having inner signal contacts in a fully assembled state according to an embodiment.

FIG. 12A shows a cross-sectional view of a further embodiment of a first insulating part **28*a* having two inner signal contacts 12 in a partly assembled state. The first insulating part 28*a* may be radially mounted to the inner signal contacts 12. As shown in FIG. 12B, the inner signal contacts 12, in particular the signal contact portions 50, are pinched into the first insulating part 28*a* in a fully assembled state of the connector assembly 110. To this end, the signal contact portions 50 may have a greater cross-sectional dimension than respective cavities 66 of the first insulating part 28*a* (see FIG. 12A). By pressing the signal contact portions 50 into the cavities 66, the cross-sectional dimension of the signal contact portions 50 is reduced to a cross-sectional dimension of the cavity 66 as shown in FIG. 12B. Furthermore, due to the reduction of the cross-sectional dimension of the signal contact portions 50, the wire insulations 20 or the conductors 21 attached to the inner signal contacts 12 are secured in the signal contact portions 50. The second insulating part 28*b* of the insulating element 28 may then be axially slid onto the inner signal contacts 12 in a direction of the first center axis 98 defined by the inner signal contacts 12 such that the inner signal contacts 12 are fully enclosed by the first insulating part 28*a* and the second insulating part 28*b***. A detailed description of an assembly process will be described further below.

Figure 12C:
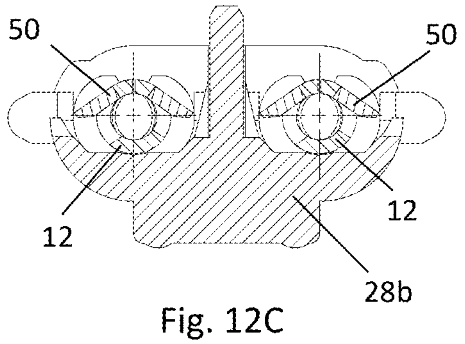
FIG. 12C shows a cross-sectional view of a second embodiment of a second insulating part having the inner signal contacts in a final position, but not yet in a fully assembled state according to an embodiment.
Figure 12D:
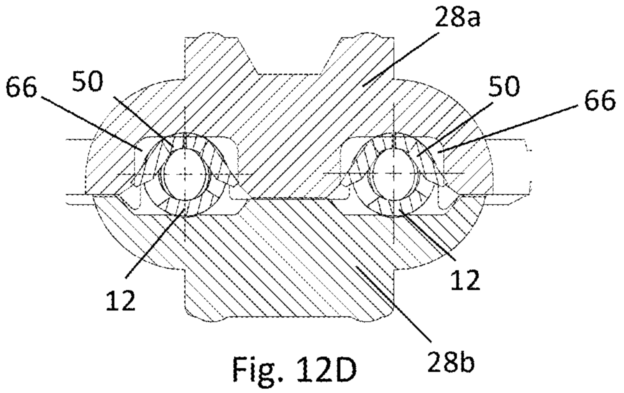
FIG. 12D shows a cross-sectional view of the second embodiment of the first insulating part having the inner signal contacts in a fully assembled state according to an embodiment.

Alternatively, according to another embodiment, the inner signal contacts 12 may be inserted into the second insulating part **28*b* as shown in FIG. 12C. More specifically, FIG. 12C shows the inner signal contacts 12 in their final position in the second insulation part 28*b*, but not yet in their fully assembled state since the first insulating part 28*a* is still to be mounted. Thus, one elongated inner signal contact 12 is pinched into the first insulating part 28*a* by radially mounting the first insulating part 28*a* in respect of the at least one elongated inner signal contact 12 and the second insulating part 28*b*, as shown in FIG. 12D. The cross-sectional dimension of the signal contact 50 is reduced to a cross-sectional dimension of the cavity 66 by pressing the first insulating part 28*a* onto the signal contact 50. Thus, the inner signal contact 12, in particular the signal contact 50, is pinched into the first insulating part 28*a* as shown in FIG. 12 D in a fully assembled state of the connector assembly 110**.

Figure 13A:
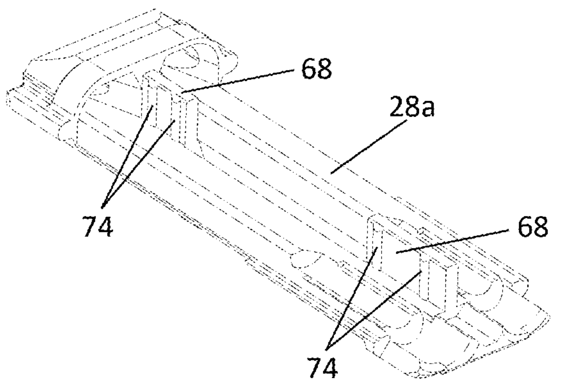
FIG. 13A shows an isometric view of a first embodiment of a first insulating part having two press-fit elements according to an embodiment.
Figure 13B:
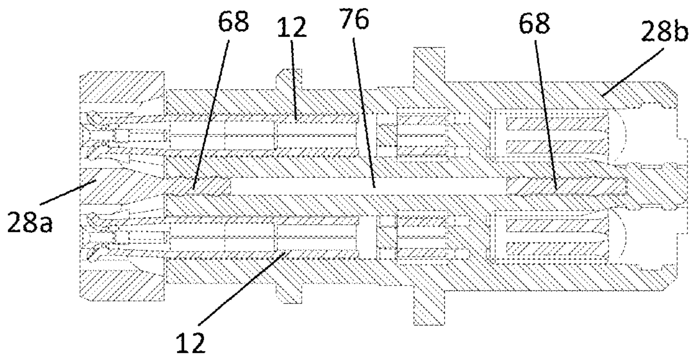
FIG. 13B shows a cross-sectional top view of the first insulating part according to an embodiment.
Figure 13C:
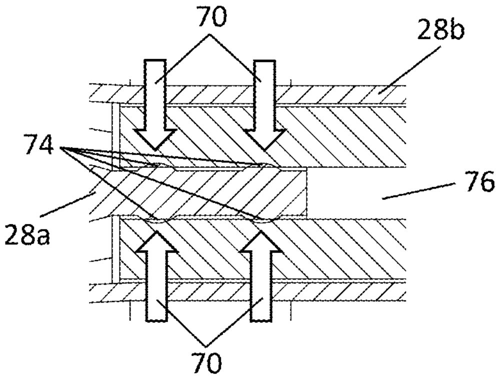
FIG. 13C shows a cross-sectional view of one of the press-fit elements engaging a second insulating part according to an embodiment.
Figure 14A:
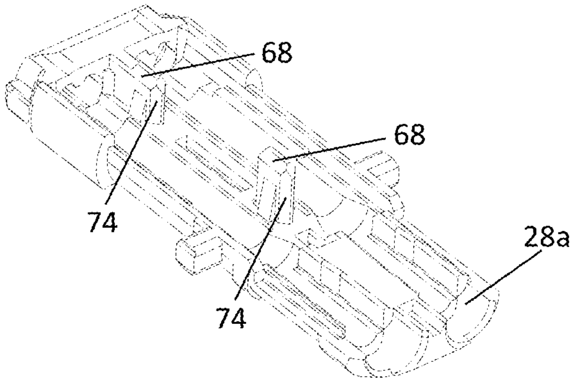
FIG. 14A shows an isometric view of a second embodiment of a first insulating part having two press-fit elements according to an embodiment.

FIGS. 13A to 13C and 14A to 14C show two embodiments of a first insulating part **28*a* having two press fit elements 68. The press fit elements 68 may be formed as cuboidal elements having protrusions 74 that protrude over the surfaces of the cuboidal elements, as shown in FIGS. 13A and 14A. Respective elements of the second insulating part 28*b* may be formed as cuboidal recesses 76 configured to receive the press fit elements 68 of the first insulating part 28*a*. A cross-sectional dimension of the cuboidal recesses 76 may be substantially the same as a cross-sectional dimension of the corresponding press fit elements 68 (the protrusions 74 not considered). When the first insulating part 28*a* and the second insulating part 28*b* are radially mounted to the inner signal contacts 12, the press fit elements 68 are inserted into the corresponding cuboidal recesses 76. The press fit elements 68 are secured in the recesses 76 by means of the protrusions 74. More specifically, the press fit elements 68 have to be pressed into the recesses 76 since the protrusions 74 lead to a cross-sectional dimension of the press fit elements 68 greater than that of the recesses 76. Depending on the arrangement of the protrusions 74, either radial forces 70 (see FIG. 13C) or axial forces 72 (see FIG. 14C) act between the first insulating part 28*a*, in particular the press fit elements 68, and the second insulating part 28*b***.

According to other embodiments shown in FIGS. 15A to 15C and 16A to 16C, a first insulating part **28*a* has at least one locking element 78. The locking element 78 may be formed as a cuboidal element having a mushroom head 79 (FIGS. 15A, 15C) or having a Y-shaped or forked head 81**

Figure 15A:
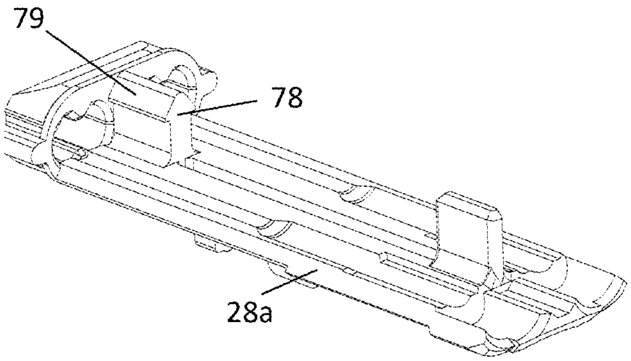
FIG. 15A shows an isometric view of a first insulating part having a locking element according to an embodiment.
Figure 15B:
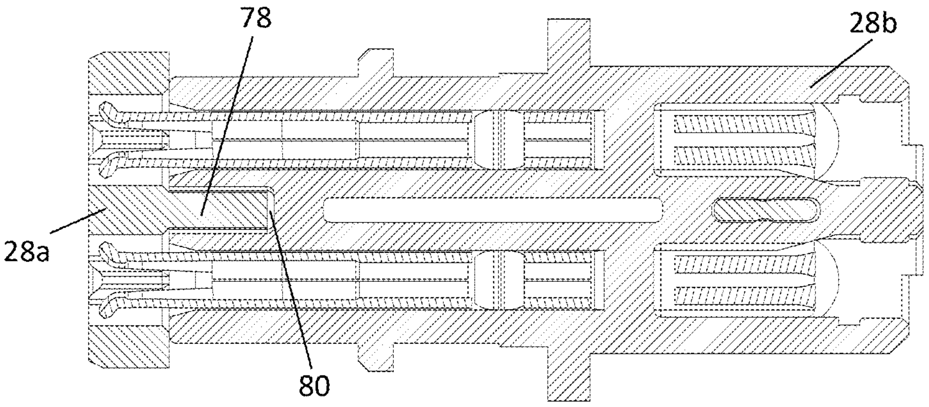
FIG. 15B shows a cross-sectional top view of the first insulating part according to an embodiment.
Figure 15C:
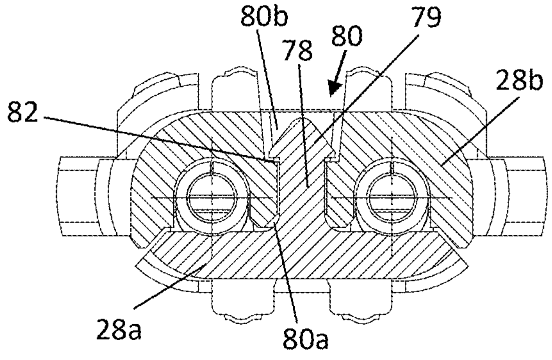
FIG. 15C shows a cross-sectional view of the locking element engaging a second insulating part according to an embodiment.
Figure 16A:
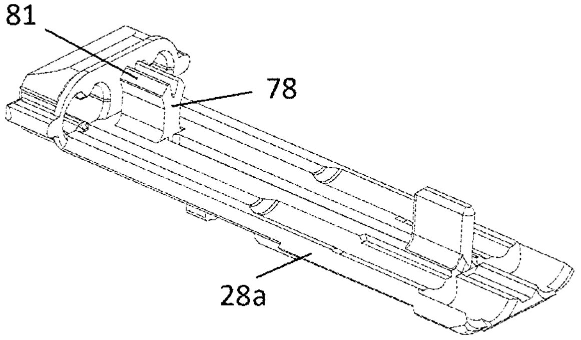
FIG. 16A shows an isometric view of a first insulating part having a locking element according to an embodiment.
Figure 16B:
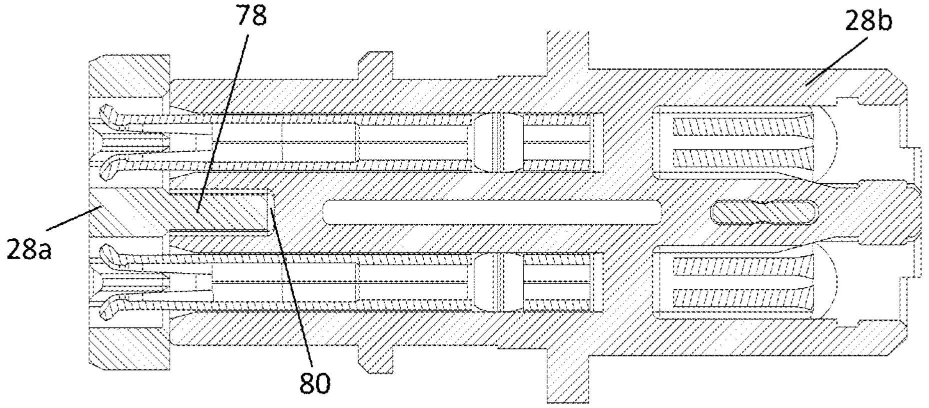
FIG. 16B shows a cross-sectional top view of the first insulating part according to an embodiment.
Figure 16C:
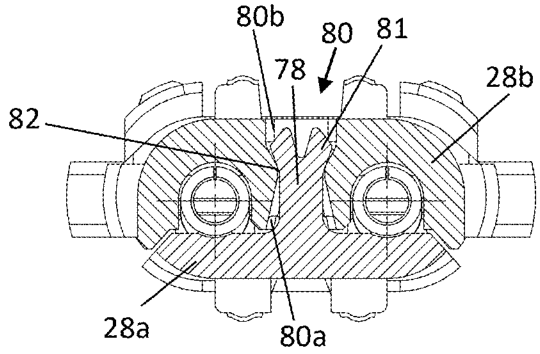
FIG. 16C shows a cross-sectional view of the locking element engaging a second insulating part according to an embodiment.

(FIGS. 16A, 16C). The second insulating part 28*b* includes a matching substantially cuboidal locking recess 80 configured to receive the locking element 78 of the first insulating part 28*a*. The locking recess 80 may include a first recess part 80*a* and a second recess part 80*b*, as shown in FIGS. 15C and 16C. A cross-sectional dimension of the first recess part 80*a* may be substantially the same as a cross-sectional dimension of the cuboidal locking element 78, i.e., the cuboidal locking element 78 fits into the first recess part 80*a*. A maximum outer cross-sectional dimension of the mushroom head 79 or the fork head 81 is greater than the cross-sectional dimension of the first recess part 80*a*. Thus, the locking element 78 has to be pressed through the first recess part 80*a* of the locking recess 80 until the mushroom head 79 or the fork head 81 reaches into the second recess part 80*b*. A cross-sectional dimension of the second recess part 80*b* of the locking recess 80 is greater than the maximum outer cross-sectional dimension of the mushroom head 79 or the forked head 81 and, thus, also greater than the first recess part 80*a* such that the first recess part 80*a* and the second recess part 80*b* of the locking recess 80 define a shoulder 82 at their transition (FIGS. 15C and 16C). When the locking element 78 is fully inserted into the locking recess 80, the mushroom head 79 or the forked head 81 sits on the shoulder 82 and thereby secures the first insulating part 28*a* to the second insulating part 28*b* (FIGS. 15C and 16C).

Figure 17A:
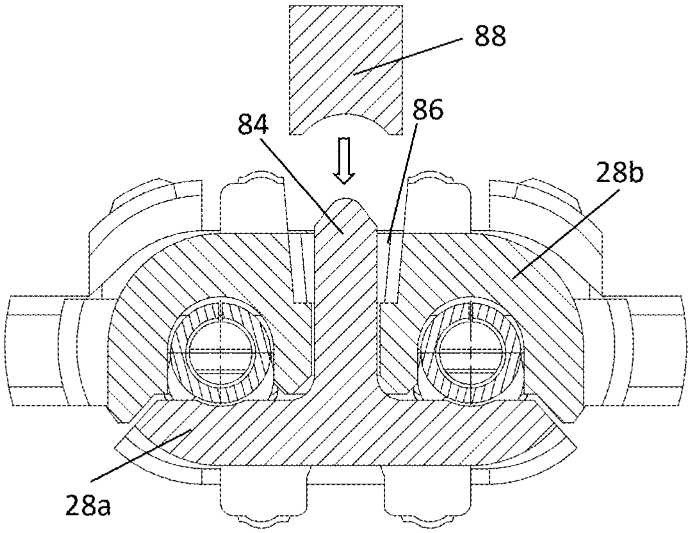
FIG. 17A shows an isometric view of a first insulating part having a pin and a second insulating part having a slot in a partly assembled state according to an embodiment.
Figure 17B:
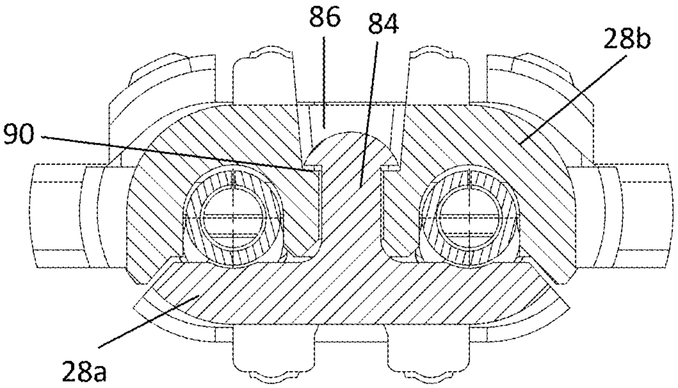
FIG. 17B shows an isometric view of the first insulating part and the second insulating part in a fully assembled state according to an embodiment.

FIG. 17A shows an embodiment of a first insulating part 28*a* and a second insulating part 28*b* having a locking pin 84 and a locking slot 86, respectively, in a partly assembled state of the connector assembly 110. The locking slot 86 is configured to receive the locking pin 84. The locking slot 86 includes a first slot part 86*a* and a second slot part 86*b*. A cross-sectional dimension of the first slot part 86*a* of the locking slot 86 may be substantially the same as a cross-sectional dimension of the locking pin 84, i.e., the locking pin 84 fits into the first slot part 86*a* of the locking slot 86 (see FIG. 17A). A cross-sectional dimension of the second slot part 86*b* is greater than the cross-sectional dimension of the locking pin 84 such that the first slot part 86*a* and the second slot part 86*b* define a shoulder 90 (see FIG. 17B). The locking slot 86 may be similar to the locking recess 80 described above. When the locking pin 84 is fully inserted into the locking slot 86 the locking pin 84 may be deformed by means of a punch tool 88. The punch tool 88 presses on to a free end of the locking pin 84 such as to deform the free end of the locking pin 84 into a mushroom head that sits on the shoulder 90, thereby securing the first insulating part 28*a* to the second insulating part 28*b* (see FIG. 17B). The locking pin 84 may be deformable in a cold or a hot state, i.e., the locking pin 84 is deformable by means of the punch tool 88 with or without preheating the locking pin 84 or the punch tool 88.

Figure 18A:
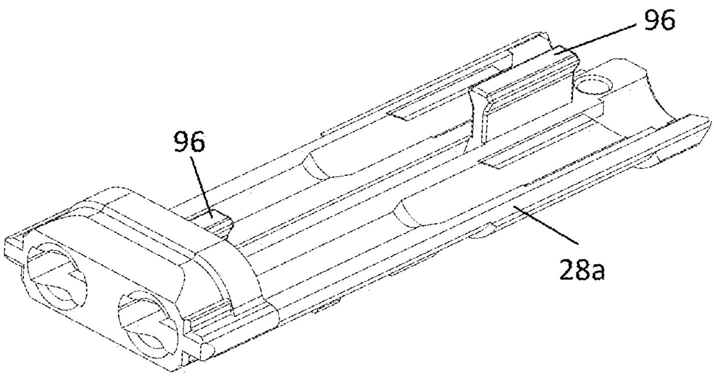
FIG. 18A shows an isometric view of a first insulating part having two tongues according to an embodiment.
Figure 18B:
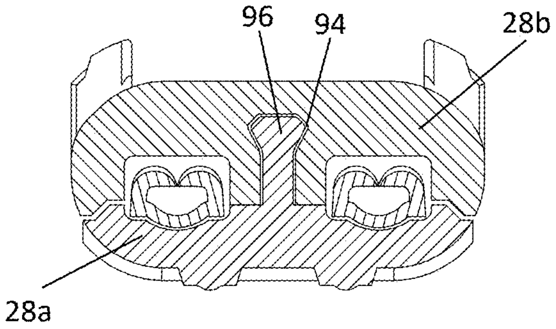
FIG. 18B shows a cross-sectional view of the first insulating part and a second insulating part showing one of the tongues in a corresponding groove of the second insulating part according to an embodiment.
Figure 18C:
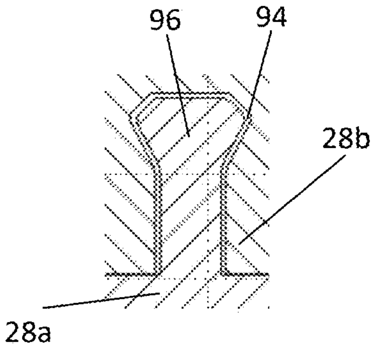
FIG. 18C shows an enlarged view of the tongue in the groove of FIG. 18B according to an embodiment.
Figure 18D:
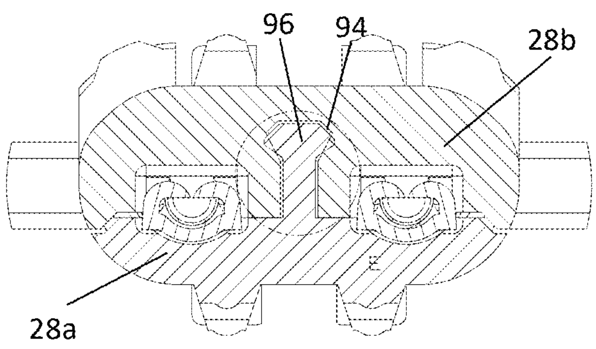
FIG. 18D shows a cross-sectional view of a first insulating part having a tongue and a second insulating part having a groove according to an embodiment.
Figure 18E:
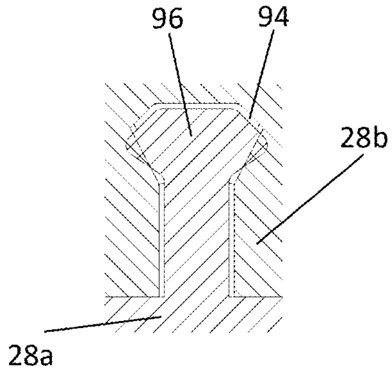
FIG. 18E shows an enlargement of the tongue in the groove of FIG. 18D according to an embodiment.
Figure 19A:
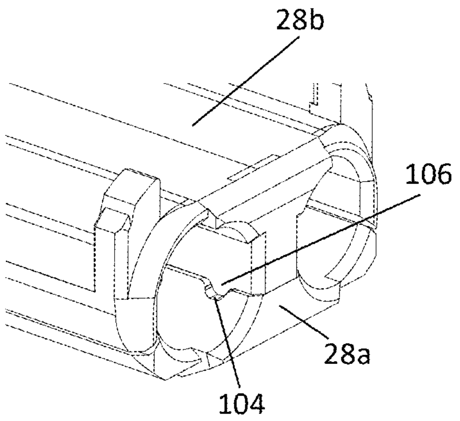
FIG. 19A shows an isometric view of a first insulating part and a second insulating part according to an embodiment.
Figure 19B:
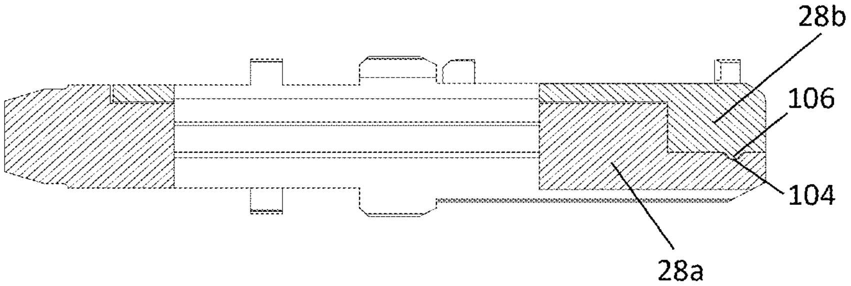
FIG. 19B shows a cross-sectional view of the first insulating part and the second insulating part according to an embodiment.
Figure 20A:
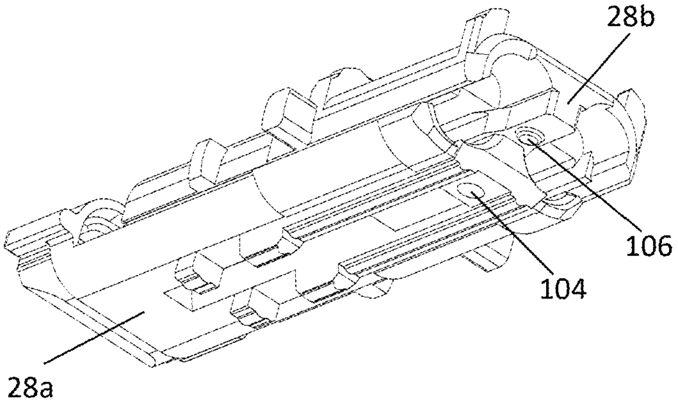
FIG. 20A shows an isometric view of a first insulating part and a second insulating part according to an embodiment.
Figure 20B:
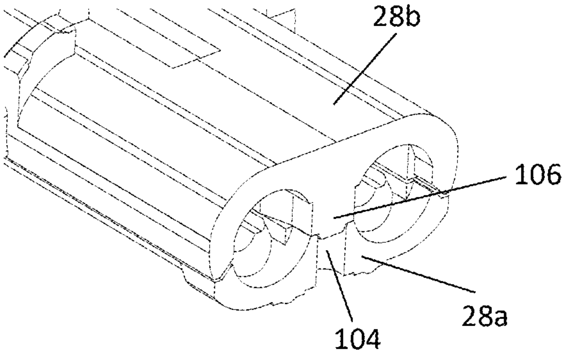
FIG. 20B shows an isometric cross-sectional view of the first insulating part and the second insulating part according to an embodiment.
Figure 20C:
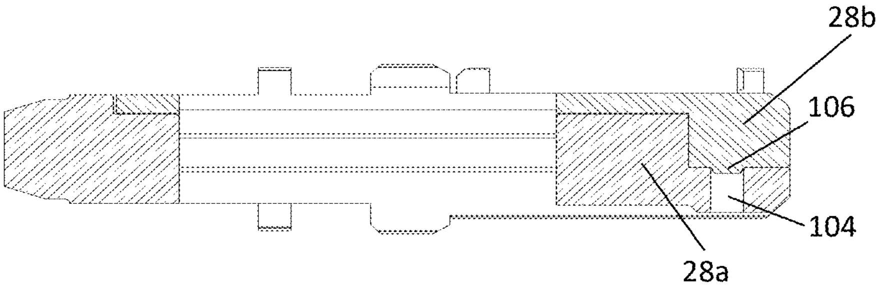
FIG. 20C shows a cross-sectional side view of the first insulating part and the second insulating part according to an embodiment.

FIG. 18A shows a first insulating part 28*a* having two tongues 96. The second insulating part 28*b* includes corresponding grooves 94 in which the tongues 96 can be received. The first insulating part 28*a* is secured to the second insulating part 28*b* by inserting the tongues 96 into their associated grooves 94 and axially sliding the first insulating part 28*a* relative to the second insulating part 28*b* in a direction of the center axes 98 defined by the inner signal contacts 12. FIGS. 18B and 18C show a cross-sectional view of one of the tongues 96 inserted into its associated groove 94. A maximum outer dimension of the tongue 96 may be substantially the same as a maximum inner dimension of the groove 94, i.e., the tongue 96 may fit into the groove 94. In an alternative embodiment shown in FIGS. 18D and 18E, the maximum outer dimension of the tongue 96 may be somewhat greater than the maximum inner dimension of the groove 94. Therefore, the tongue 96 has to be forced into the groove 94 and is somewhat deformed when fully inserted into the groove 94.

FIGS. 19A, 19B and 20A-20C show two embodiments of an insulating element 28 in which a first insulating part 28*a* includes a locking cavity 104 and a second insulating part 28*b* includes a locking protrusion 106 to be received in the locking cavity 104. The locking protrusion 106 extends into the locking cavity 104 when the connector assembly 110 is correctly assembled.

Figure 14B:
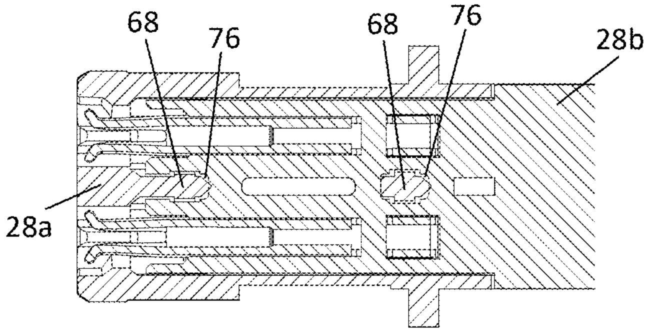
FIG. 14B shows a cross-sectional top view of the first insulating part according to an embodiment.
Figure 14C:
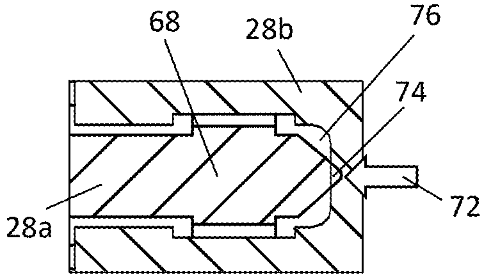
FIG. 14C shows a cross-sectional view of one of the press-fit elements engaging a second insulating part according to an embodiment.
Figure 21A:
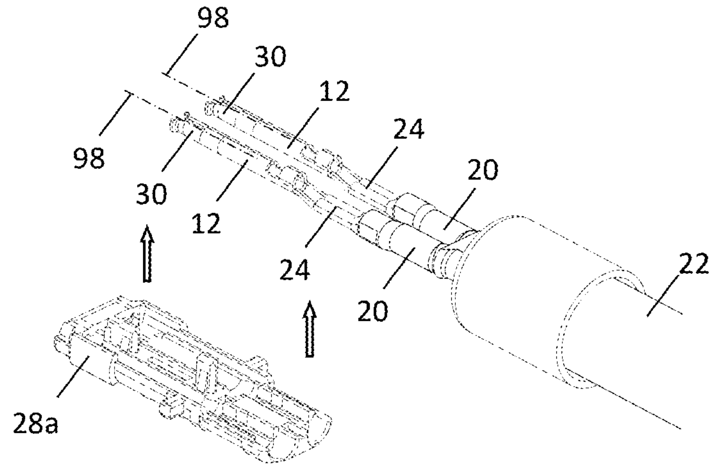
FIG. 21A shows a first step of mounting a first insulating part to inner signal contacts according to an embodiment.
Figure 21B:
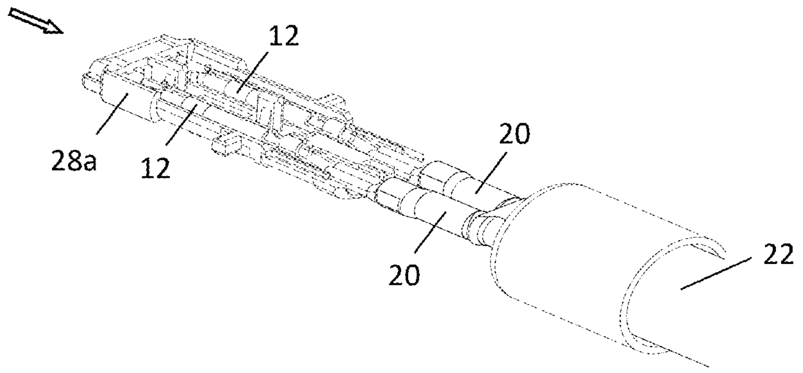
FIG. 21B shows a second step of mounting the first insulating part to the inner signal contacts according to an embodiment.
Figure 21C:
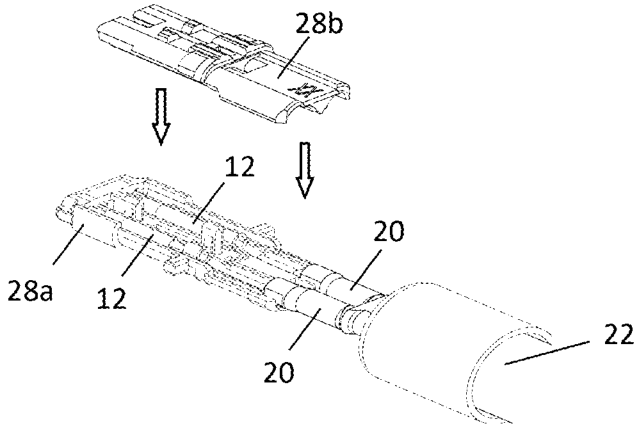
FIG. 21C shows a step of mounting a second insulating part to the assembly of the first insulating part and the inner signal contacts according to an embodiment.

FIGS. 21A and 21B depict a process of assembling a connector assembly 110 having an insulating element 28 as described in connection with FIGS. 14A to 14C. First, conductors 21 of a cable 22 are connected to the inner signal contacts 12 by attaching the wire insulations 20 to the inner signal contacts 12 by means of a termination element 24, for example, crimping wings. A first insulating part 28*a* is then radially mounted to the inner signal contacts 12 such that the inner signal contacts 12 are embedded in cavities 32 of the first insulating part 28*a*. Once the inner signal contacts 12 are arranged in the cavities 32, the first insulation part 28*a* is axially slid into position along the inner signal contacts 12 in a direction of the center axes 98 defined by the inner signal contacts 12 (see FIG. 21B). By sliding the first insulating part 28*a* in the direction of the center axes 98, funnel-shaped end sections 30 of the inner signal contacts 12 are optionally widened by means of ribs 46, if ribs 46 are arranged in a front opening 40 of the first insulation part 28*a*, as described above. Subsequently, a second insulating part 28*b* is radially mounted to the inner signal contacts 12 and secured to the first insulating part 28*a* (see FIG. 21C) as described above.

Figure 22A:
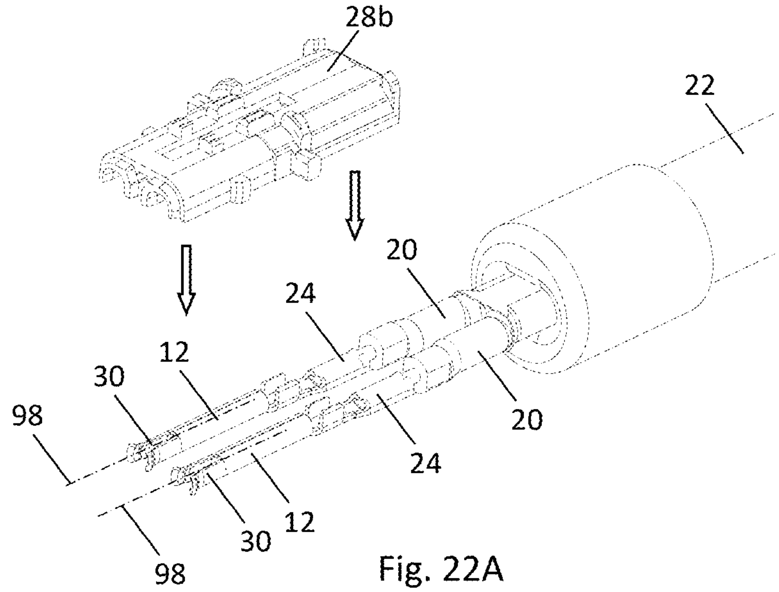
FIG. 22A shows a step of mounting a second insulating part to inner signal contacts according to an embodiment.
Figure 22B:
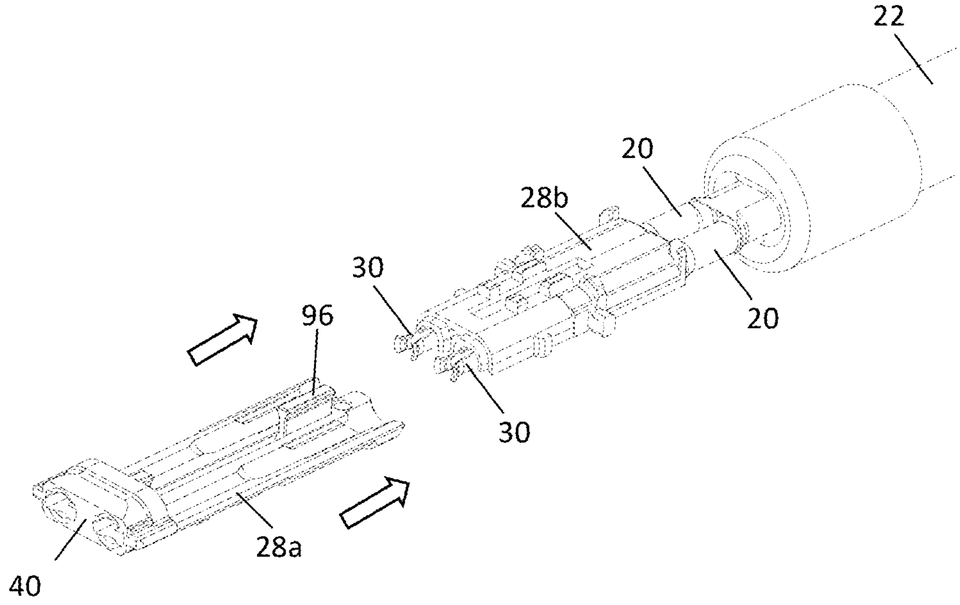
FIG. 22B shows a step of mounting a first insulating part to the assembly of the second insulating part and the inner signal contacts according to an embodiment.

FIGS. 22A and 22B depict an alternative process of assembling a connector assembly 110 as described herein. First, conductors 21 of a cable 22 are connected to the inner signal contacts 12 by attaching the wire insulations 20 to the inner signal contacts 12 by means of a termination element 24, for example crimping wings. A second insulating part 28*b* is then radially mounted to the inner signal contacts 12 such that the inner signal contacts 12 are embedded in cavities 32 of the second insulating part 28*b* (FIG. 22A). Once the inner signal contacts 12 are secured in the second insulating part 28*b* as described above, a first insulating part 28*a* is mounted to the second insulating part 28*b*, as shown in FIG. 22B. The first insulation part 28*a* is axially slid onto the inner signal contacts 12 in a direction of the center axes 98 defined by the inner signal contacts 12. By sliding the first insulating part 28*a* in the direction of the center axes 98 of the inner signal contacts 12, funnel-shaped end sections 30 of the inner signal contacts 12 enter front openings 40 of the first insulating part 28*a* and are optionally widened by means of ribs 46, if ribs 46 are arranged in the front openings 40, as described above. The first insulating part 28*a* is secured to the second insulation part 28*b* by means as described above, for example, by means of tongues 96 and grooves 94.

Figure 23A:
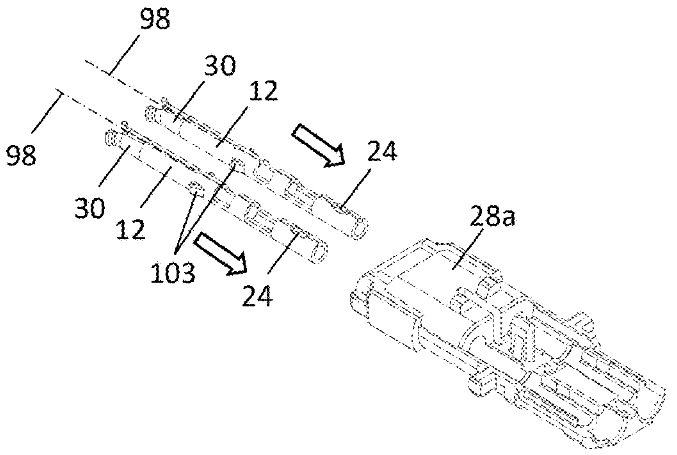
FIG. 23A shows a step of inserting inner signal contacts into a first insulating part according to an embodiment.
Figure 23B:
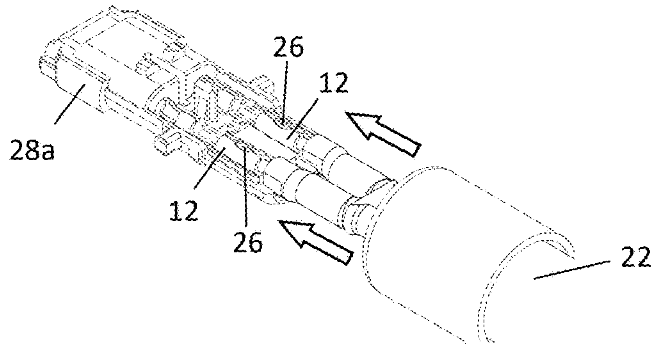
FIG. 23B shows a step of attaching wires to the inner signal contacts according to an embodiment.
Figure 23C:
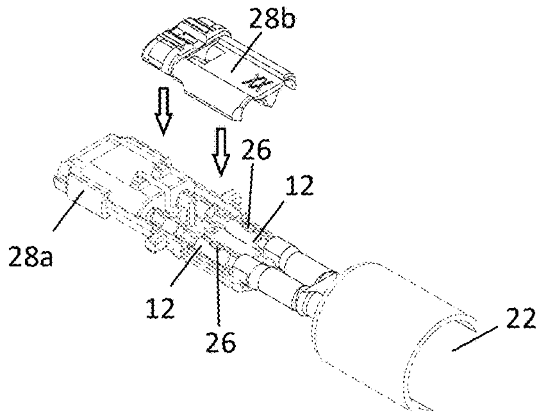
FIG. 23C shows a step of attaching a second insulating part to the assembly of the first insulating part and the inner signal contacts according to an embodiment.

FIGS. 23A to 23C depict another process of assembling a connector assembly 110, in particular for inner signal contacts 12 having welding openings 26 to connect the inner signal contacts 12 to conductors 21 of a cable 22 via welding, e.g., laser, ultrasonic or resistance welding. FIG. 23A shows a step of inserting inner signal contacts 12 into a first insulating part 28*a*. The inner signal contacts 12 are axially slid into cavities 32 of the first insulating part 28*a* in a direction of the center axes 98 defined by the inner signal contacts 12. Thus, the inner signal contacts 12 may be secured in the first insulating part 28*a* by features as described above, for example, by means of hooks 103. Once the inner signal contacts 12 are secured in the first insulating part 28*b*, a step of attaching conductors 21 of a cable 22 to the inner contacts 12 follows, as shown in FIG. 23B. The conductors 21 are connected to the inner signal contacts 12 via laser welding or ultrasonic welding or resistance welding in the welding openings 26. Subsequently, a second insulating part 28*b* is attached to the first insulating part 28*a* (see FIG. 23C). More specifically, the second insulating part 28*b* is radially mounted to the inner signal contacts 12 and the first insulating part 28*a*. Therein, the second insulation part 28*b* is secured to the first insulating part 28*a* by means as described above.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A connector assembly, comprising:

at least one elongated inner signal contact having a first connection portion, wherein the first connection portion includes a tube-like main section and a funnel-shaped end section; and an insulating element, wherein the insulating element defines at least one elongated cavity designed to accommodate the elongated inner signal contact, wherein a maximum outer cross-sectional dimension of the funnel-shaped end section is greater than a minimum cross-sectional dimension of the elongated cavity, wherein the funnel-shaped end section includes a first end section part and a second end section part, wherein the first end section part and the second end section part are separated by two air gaps, and wherein the insulating element includes at least one rib engaging one of the air gaps, thereby widening the funnel-shaped end section.

2. The connector assembly according to claim 1, wherein the insulating element includes at least one front opening configured to receive the funnel-shaped end section, and two chamfers protruding into the air gaps such that the first end section part, the second end section part and the two chamfers define an inlet.

3. The connector assembly according to claim 1, wherein the insulating element and the at least one elongated inner signal contact include at least one protrusion and at least one recess, respectively and wherein the protrusion and the recess are configured to cooperate in order to at least reduce at least one of a rotation and an axial movement of the at least one elongated inner signal contact relative to the insulating element.

4. The connector assembly according to claim 1, wherein the insulating element includes at least one clamping element configured to secure a wire insulation or a conductor to which the at least one elongated inner signal contact is connected.

5. The connector assembly according to claim 1, wherein the at least one elongated inner signal contact includes a termination element configured to receive a wire insulation and wherein the insulating element includes at least one retaining element configured to secure at least one of the termination element and the wire insulation in the insulating element.

6. The connector assembly according to claim 1, wherein the insulating element includes a first insulating part and a second insulating part and wherein the first insulating part and the second insulating part together surround the at least one inner signal contact.

7. The connector assembly according to claim 6, wherein one of the first insulating part and the second insulating part is configured to be radially mounted in respect of the at least one elongated inner signal contact and the respective other of the first insulating part and the second insulating part is configured to be axially slid onto the at least one elongated inner signal contact.

8. The connector assembly according to claim 6, wherein the at least one elongated inner signal contact is pinched into the first insulating part or the second insulating part.

9. The connector assembly according to claim 6, wherein the first insulating part or the second insulating part includes a press fit element configured to secure the first insulating part to the second insulating part.

10. The connector assembly according to claim 6, wherein the first insulating part or the second insulating part includes at least one locking element configured to snap fit the first insulating part and the second insulating part together, thereby securing the first insulating part to the second insulating part.

11. The connector assembly according to claim 6, wherein the first insulating part or the second insulating part includes a locking pin and the respective other one of the first insulating part and the second insulating part includes a locking slot and wherein the locking slot is configured to receive the locking pin and the locking pin is deformed and secured in the locking slot to thereby secure the first insulating part to the second insulating part.

12. The connector assembly according to claim 6, wherein the first insulating part or the second insulating part includes a groove and the respective other one of the first insulating part and the second insulating part includes a tongue received in the groove.

13. The connector assembly according to claim 6, wherein the first insulating part or the second insulating part includes a locking cavity and the respective other one of the first insulating part and the second insulating part includes a locking protrusion received in the locking cavity.

14. A connector assembly, comprising: at least one elongated inner signal contact having a first connection portion, wherein the first connection portion includes a tube-like main section and a funnel-shaped end section; and an insulating element, wherein the insulating element defines at least one elongated cavity designed to accommodate the elongated inner signal contact, wherein a maximum outer cross-sectional dimension of the funnel-shaped end section is greater than a minimum cross-sectional dimension of the elongated cavity, wherein the funnel-shaped end section includes a first end section part and a second end section part, wherein the first end section part and the second end section part are separated by two air gaps, and wherein the insulating element includes at least one front opening configured to receive the funnel shaped end section, and two chamfers protruding into the air gaps such that the first end section part, the second end section part and the two chamfers define an inlet; and wherein the insulating element includes a control element and the at least one elongated inner signal contact includes a hole receiving the control element when the connector assembly is correctly assembled.

15. The connector assembly according to claim 14, wherein the insulating element and the at least one elongated inner signal contact include at least one protrusion and at least one recess, respectively and wherein the protrusion and the recess are configured to cooperate in order to at least reduce at least one of a rotation and an axial movement of the at least one elongated inner signal contact relative to the insulating element.

16. The connector assembly according to claim 14, wherein the insulating element includes at least one clamping element configured to secure a wire insulation or a conductor to which the at least one elongated inner signal contact is connected.

17. The connector assembly according to claim 14, wherein the at least one elongated inner signal contact includes a termination element configured to receive a wire insulation and wherein the insulating element includes at least one retaining element configured to secure at least one of the termination element and the wire insulation in the insulating element.

18. The connector assembly according to claim 14, wherein the insulating element includes a first insulating part and a second insulating part and wherein the first insulating part and the second insulating part together surround the at least one inner signal contact.

* * * * *